United States Patent
Kazmi et al.

(10) Patent No.: US 10,271,313 B2
(45) Date of Patent: Apr. 23, 2019

(54) SYSTEM AND METHOD FOR SELECTING AND ADAPTING CARRIER AGGREGATION CONFIGURATIONS

(71) Applicant: Telefonaktiebolaget LM Ericsson (publ), Stockholm (SE)

(72) Inventors: Muhammad Kazmi, Bromma (SE); Christian Bergljung, Lund (SE); Farshid Ghasemzadeh, Sollentuna (SE); Imadur Rahman, Sollentuna (SE); Erika Tejedor, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 15/064,852

(22) Filed: Mar. 9, 2016

(65) Prior Publication Data

US 2016/0270047 A1    Sep. 15, 2016

Related U.S. Application Data

(60) Provisional application No. 62/131,107, filed on Mar. 10, 2015.

(51) Int. Cl.
*H04W 28/02* (2009.01)
*H04W 72/04* (2009.01)
*H04L 5/00* (2006.01)

(52) U.S. Cl.
CPC ......... *H04W 72/0406* (2013.01); *H04L 5/001* (2013.01); *H04L 5/0005* (2013.01); *H04L 5/0039* (2013.01); *H04L 5/0096* (2013.01)

(58) Field of Classification Search
None
See application file for complete search history.

(56) References Cited

U.S. PATENT DOCUMENTS

| | | | |
|---|---|---|---|
| 2011/0103243 A1* | 5/2011 | Larsson | H04L 5/001 370/252 |
| 2012/0106404 A1* | 5/2012 | Damnjanovic | H04L 5/001 370/279 |

(Continued)

OTHER PUBLICATIONS

PCT Notification of Transmittal of the International Search Report and the Written Opinion of the International Searching Authority, or the Declarations with International Search Report and the Written Opinion of the International Search Authority in International Application No. PC/IB2016/051375, dated Jun. 7, 2016, 12 page.

*Primary Examiner* — Sithu Ko
(74) *Attorney, Agent, or Firm* — Baker Botts, LLP

(57) ABSTRACT

A method for selecting carrier aggregation (CA) configurations includes determining whether a first wireless device is operating or expected to operate using a single carrier configuration on a cell associated with a first frequency band. If the first wireless device is not operating or expected to operate using a single carrier configuration on a cell associated with a first frequency band, a first CA configuration is selected for a second wireless device. If the first wireless device is operating or expected to operate using a single carrier configuration on a cell associated with a first frequency band, a second CA configuration that is more restrictive than the first CA configuration is selected for the second wireless device. An identifier of the selected one of the first CA configuration or the second configuration is transmitted to the second wireless device.

20 Claims, 15 Drawing Sheets

(56) References Cited

U.S. PATENT DOCUMENTS

| | | | |
|---|---|---|---|
| 2013/0128827 A1* | 5/2013 | Cheng | H04W 24/02 370/329 |
| 2013/0258936 A1* | 10/2013 | Choi | H04W 72/0453 370/312 |
| 2014/0328228 A1* | 11/2014 | Park | H04B 7/2615 370/280 |
| 2015/0289255 A1* | 10/2015 | Lim | H04W 72/0413 370/329 |

* cited by examiner

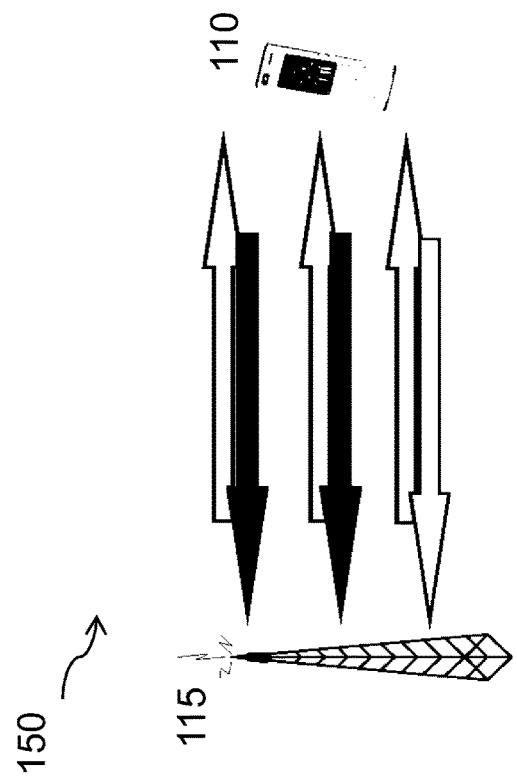
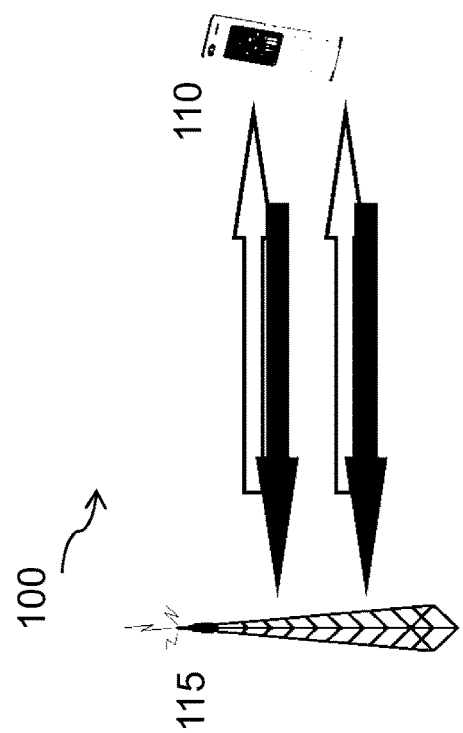
FIGURE 1A (PRIOR ART)
FIGURE 1B (PRIOR ART)

SYSTEM AND METHOD FOR SELECTING AND ADAPTING CARRIER AGGREGATION CONFIGURATIONS

PRIORITY CLAIM

This application claims priority to U.S. Patent Provisional Application No. 62/131,107 filed on Mar. 10, 2015, entitled "Adapting Carrier Aggregation Configurations," the disclosure of which is hereby incorporated by reference.

TECHNICAL FIELD

Particular embodiments relate generally to wireless communications and more particularly to system and method for selecting and adapting carrier aggregation configurations under adjacent channel interference.

BACKGROUND

Using multicarrier or carrier aggregation (CA) operations, wireless devices in an LTE network may be able to receive and/or transmit data from/to more than one serving cells. FIGS. 1A-1B are schematic diagrams illustrating example carrier aggregation scenarios. Specifically, FIG. 1A illustrates an example network system 100 that includes a wireless device 110 that is able to receive and/or transmit data to a network node 115 via two uplink (UL) and two downlink (DL) inter-band component carriers (CC). FIG. 1B illustrates an example network system 150 that includes wireless device 110 being able to receive and/or transmit data to network node 115 via three uplink (UL) and two downlink (DL) inter-band component carriers (CC).

In general, a CA-capable wireless device 110 can be configured to operate with more than one serving cells. The carrier of each serving cell is generally called as a component carrier (CC). The component carrier (CC) means an individual carrier in a multi-carrier system. The term carrier aggregation (CA) is also called (e.g. interchangeably called) "multi-carrier system," "multi-cell operation," "multi-carrier operation," "multi-carrier" transmission and/or reception. A wireless device 110 may be interchangeably called user equipment (UE).

CA is used for transmission of signaling and data in the uplink and downlink directions. One of the CCs is the primary component carrier (PCC) or primary carrier or anchor carrier. The remaining CCs may be called secondary component carriers (SCCs) or secondary carriers or supplementary carriers. The serving cell may be interchangeably called a primary cell (PCell) or primary serving cell (PSC). The secondary serving cell may be interchangeably called a secondary cell (SCell) or secondary serving cell (SSC).

The PCC or anchor CC can carry the essential wireless device-specific signaling. The PCC (or PCell) exists in both uplink and downlink directions in CA. Where there is a single UL CC, the PCell uses that CC. The network node 115 may assign different primary carriers to different wireless devices 110 operating in the same sector or cell.

FIG. 2 is a schematic diagram illustrating an example network 200 including wireless devices deploying dual-connectivity. Similar to CA, dual connectivity also provides a way for aggregating multiple carriers from independent transmission nodes 115 to any wireless device 110. Dual Connectivity (DC) refers to the operation where a given wireless device 110 consumes radio resources provided by at least two different network points. In certain embodiments, the network points may include a main network node 115A and a secondary network node (SeNB) 115B. In certain embodiments, the main network node 115A may include a main eNodeB (MeNB), and the secondary network node 115B may include a secondary eNodeB (SeNB). The main network node 115A and the secondary network node 115B are connected with non-ideal backhaul 210A while in RRC_CONNECTED. Wireless device 110A in dual connectivity maintains simultaneous connections to main network node 115A and secondary network node 115B. Main network node 115A may be referred to as an anchor node, and the secondary network node 115B may be referred to as a booster node.

As the name implies, the main network node 115A controls the connection and handover of secondary network node 115B. No secondary network node 115B standalone handover is defined for Rel-12. Thus, signaling by the MeNB is needed for SeNB changes. Both the anchor node and booster node are able terminate the control plane connection towards wireless device 110A and may, thus, be the controlling nodes of wireless device 110A, in certain embodiments.

Contrary to CA, dual connectivity involves independent transmission from different network nodes 115A and 115B to any wireless device 110A. At least one cell 212A of both main network node 115A and secondary network node 115B contains both UL and DL. The cell having both UL and DL may be identified as the PCell for main network node 212A and the PSCell for secondary network node 115B. There may be more secondary cells (SCell) attached to either main network node 115A and/or secondary network node 115B.

In the example embodiment depicted in FIG. 2, only one secondary network node 115B is connected to wireless device 110A. However, it is recognized that more than one secondary network node 115B may serve wireless device 110A. Typically, wireless device 110A is configured with at least a PCC from main network node 115A and also a PCC from secondary network node 115B. The primary serving cells on PCCs from main network node 115A and secondary network node 115B are generally called the PCell and PSCell, respectively. Wireless device 110A may also be configured with one or more SCCs from main network node 115A and secondary network node 115B. The serving cell on SCC may be called as secondary serving cell (SCell). Additionally, the PCell and PSCell typically operate or serve wireless device 110A independently. As shown in FIG. 2, dual connectivity is a wireless device-specific feature and network node 115A-B may support a dual connected wireless device 110A and a legacy UE 110B at the same time.

Interference between UL and DL may occur when an frequency division duplex (FDD) system operates next to a time division duplex (TDD) system in adjacent bands. FIG. 3 illustrates a schematic diagram illustrating the operation of a FDD system 302 next to a TDD system 304 in the adjacent bands. Specifically, FIG. 3 illustrates an example scenario wherein a FDD system 302 operates in E-UTRA band 7 in 2.6 GHz adjacent to a TDD system 304 operating in E-UTRA band 38 in 2.6 GHz. The FDD and TDD systems in these bands (band 7 and band 38 respectively) may use carriers which are next to each other. As such, if an FDD system operates in the same geographical area with a TDD system when the TDD and FDD carriers are close the edge of the bands, then UL-DL interference may occur. Even perfect time synchronization of the systems may not avoid the UL-DL interference, in certain embodiments.

In contrast to TDD-TDD adjacent device-to-device (UE-to-UE) interference in the same band, a band select filter may improve the receiver blocking performance in case of TDD-FDD operated in adjacent bands, such as the scenario described below with respect to FIG. 8. Accordingly, additional isolation due to band select filter and also assumed guard bands 306 in both edges of the TDD band 304 may result in comparably favorable situation for TDD/FDD in adjacent bands case as compared to TDD/TDD in the same band case. In the example scenario of FIG. 3, guard bands 306 of 10 MHz are employed between FDD system 302 and TDD system 304.

When an UL transmission interferes with a DL reception and/or a DL transmission interferes with an UL reception, UE-to-UE interference and/or base station to base station (BS-to-BS) interference may occur. This occurs in addition to base station-to-device (BS-to-UE) and device-to-base station (UE-to-BS) adjacent channel interferences similar to FDD/FDD coexistence scenario. The UE-to-UE and BS-to-BS interference problems for band 7 and band 38 in the same geographical area are shown in FIG. 4 and FIG. 5, respectively. Specifically, FIG. 4 is a schematic diagram of a system 400 that may experience UE-to-UE interference between TDD and FDD in 2600 MHz bands. Similarly, FIG. 5 is a schematic diagram of a system 500 that may experience BS-to-BS interference between TDD and FDD in 2600 MHz bands.

BS-to-BS interference can be handled with band specific filters, site solutions and guard bands. It may be a "simple" deterministic problem in certain deployment scenarios wherein carrier and/or operator specific filters can be implemented at the BS side. However, UE-to-UE interference is more challenging to handle with filters. Unlike a BS-to-BS interference case, special filter solutions at the wireless device may be infeasible due to cost, size, etc. Additionally, when a wireless device is roaming, the wireless device may need to transmit and receive in many other bands (compared to home operator bands), which may also increase the filter design costs.

For at least these reasons, TDD/FDD adjacent channel interference such as that shown for the bands shown in FIG. 1 may continue to be an issue where FDD and TDD systems cannot be coordinated. Stated differently, UL to DL interference remain an issue for FDD and TDD adjacent systems and is likely to be handled by band select filters since other solutions than coordination may be required.

Adjacent channel interference may also be an issue between two TDD systems. In certain embodiments, two TDD systems may be operated using TDD synchronization (i.e. time-alignment) and UL to DL coordination to avoid TDD-TDD adjacent channel interference. More specifically, these techniques may be employed to avoid interference between UL and DL slots. However, such techniques may require coordination between operators. Specifically, when TDD configurations used in two different cells operating in the band edges of two neighboring TDD bands are not coordinated, then BS-to-BS interference and UE-to-UE interference may occur. This is similar to the TDD-FDD case described above. FIG. 6 is a schematic diagram illustrating the potential for BS-to-BS interference and UE-to-UE interference caused by TDD-TDD adjacent bad operations. More specifically, FIG. 6 illustrates the potential interference resulting from the operation of wireless device 610A and network node 615A in band 42 and wireless device 610B and network node 615B in band 43.

The occurrence of UE-to-UE interference may adversely impact the operation of the transceiver of the wireless device 610A-610B. For example, UE-to-UE interference may result in transmitter leakage and/or receiver blocking that may cause the wireless device 610A-610B not able to function properly. FIG. 7 is schematic diagram illustrating transmitter leakage of signals into the victim receiver in a system 700. FIG. 8 is a schematic diagram illustrating receiver blocking in a system 800. Still another adverse impact of UE-to-UE interference may be that one of the primary benefits of TDD (i.e. configurable UL to DL asymmetry) may be hampered.

LTE operation may soon expand to the unlicensed band. Allowing unlicensed access for LTE systems may provide certain advantages. For example, an LTE FDD and/or TDD carrier may be aggregated with an LTE carrier in the unlicensed band. The unlicensed carrier may be either in FDD Supplemental Downlink (SDL) or in TDD fashion. SDL carrier is a DL only carrier which is used only as a secondary cell (SCell) with a primary cell (PCell). In certain embodiments, when one or more licensed LTE carriers are aggregated with one or more unlicensed LTE carriers, then the unlicensed LTE band is referred to as an LAA band. LAA may also be employed with Dual Connectivity, wherein aggregation is done based on Dual Connectivity principles rather than Carrier Aggregation principles. Still another advantage may be that stand-alone unlicensed LTE access may be enabled. Specifically, two LTE carriers in unlicensed bands can be aggregated either in CA or in DC manner.

Similar situation as described for TDD-FDD and TDD-TDD cases can also arise when operating in CA involving FDD/TDD frequency bands with unlicensed bands, as for unlicensed bands possibly DL only operation or TDD operation can apply in different time instances.

As mentioned briefly above, adjacent channel interference may negatively impact the transceiver of a wireless device. For example, adjacent channel interference may result in transmitter-side imperfections. Specifically, transmitter emissions within the receiver band may result due to out-of-band (OOB) or spurious emissions. As depicted in FIG. 7, unwanted transmitter emissions falling within receiver channel cannot be suppressed by receiver channel select filters. Thus, the OOB emissions from aggressor wireless devices towards the victim receivers add to total interference levels in the baseband.

OOB emissions may be defined in two ways. First, OBB emissions may be defined by Spectrum emission mask (SEM). Second, OBB emissions may be defined by Adjacent channel leakage ratios (ACLR). Both SEM and ACLR are ways to measure the performance of a transmitter. SEM provides the mechanism for suppression of unwanted power outside the carrier bandwidth, while the ACLR measures the exact amount of power that can be 'leaked' into adjacent channels. In LTE specifications, SEM has a much narrower reference bandwidth than ACLR. In LTE requirements, ACLR gives stricter performance requirement than SEM. A such, satisfying ACLR requirements would also satisfy SEM requirements.

Adjacent channel interference may also result in receiver-side imperfections, in certain embodiments. For example, imperfect receiver-side filtering may result in a strong interfering signal at an adjacent channel, which can in turn cause the receiver of a victim wireless device 110 to be desensitized. Increased desensitization levels cause a receiver to become blocked, which may be referred to as receiver blocking.

As noted above, FIG. 8 illustrates the impact of strong interfering signals at the victim receiver due to imperfect receiver filtering. Strong interference signals 802 from adjacent channel transmission saturates receiver front-end 804 before RX channel filtering 806. This phenomenon takes place after the band selective filter 808, so even a guard band (within the band) will not help mitigate the interference.

In case of TDD and FDD systems operating in different bands, the band select filter 808 will provide some additional isolation between TDD and FDD systems, thus the receiver blocking performance will be improved.

In certain embodiments, the wireless device may be barred to access a cell or may be barred for accessing certain type of services. For example, a wireless device may be barred from accessing MBMS, video calls, voice calls, or other services. To enable access barring, the cell transmits access barring information in a system information (SI) message. For example, the access barring information may be transmitted in an SIB2 message in LTE. Before selecting a cell, a wireless device in idle state reads the SI message. If the SI message includes access barring information, the wireless device may not reselect that cell. Similarly, a current serving cell will not handover a wireless device to a target cell where access barring is enabled if the serving cell is aware of the access barring status of the target cell. The wireless device may also abort handover to a target cell where the handover command indicates that the target cell has enabled access barring. Specifically, the wireless device may abort handover to the target cell if the SIB2 message of the target cell includes access barring information.

For at least these reasons, a CA capable wireless device configured to operate in CA band combination involving FDD and TDD frequency bands which are adjacent or very close to each to each other in frequency domain may degrade or even disrupt operation of other wireless devices operating in these bands. A similar situation also arises if different UL/DL TDD configurations are used in different TDD bands or carriers in the same band, which are adjacent or close to each other (e.g. band 42 and band 43), or where different LTE cells operate in unlicensed bands. A legacy single carrier operation involves both UL and DL transmission in the serving cell of the wireless device. Therefore any legacy single carrier operation in these bands may seriously degrade or even disrupt CA operation.

SUMMARY

Methods and systems are provided for ensuring that the CA operation in adjacent FDD and TDD bands is performed without any disruption.

According to certain embodiments, a method by a network node for selecting carrier aggregation (CA) configurations includes determining whether a first wireless device is operating or expected to operate using a single carrier configuration on a cell associated with a first frequency band. If the first wireless device is not operating or expected to operate using a single carrier configuration on a cell associated with a first frequency band, a first CA configuration is selected for a second wireless device. Conversely, if the first wireless device is operating or expected to operate using a single carrier configuration on a cell associated with a first frequency band, a second CA configuration is selected for the second wireless device. The first CA configuration and the second CA configuration include configurations for carrier operation on the first frequency band, and at least one parameter associated with the second CA configuration is more restrictive than at least one parameter associated with the first configuration. An identifier is transmitted to the second wireless device to identify the selected one of the first CA configuration or the second CA configuration.

According to certain embodiments, a network node includes a memory storing computer-readable instructions for selecting carrier aggregation (CA) configurations and a processor that is operable, when executing the computer-readable instructions, to determine whether a first wireless device is operating or expected to operate using a single carrier configuration on a cell associated with a first frequency band. If the first wireless device is not operating or expected to operate using a single carrier configuration on a cell associated with a first frequency band, a first CA configuration is selected for a second wireless device. Conversely, if the first wireless device is operating or expected to operate using a single carrier configuration on a cell associated with a first frequency band, a second CA configuration is selected for the second wireless device. The first CA configuration and the second CA configuration include configurations for carrier operation on the first frequency band, and at least one parameter associated with the second CA configuration is more restrictive than at least one parameter associated with the first configuration. The at least one processor is operable to execute the instructions to transmit an identifier to the second wireless device to identify the selected one of the first CA configuration or the second CA configuration.

According to certain embodiments, a method for adapting carrier aggregation (CA) configurations by a wireless device includes obtaining information about a plurality of CA configurations for a CA operation. The plurality of configurations include at least a first CA configuration and a second CA configuration. The first CA configuration and the second CA configuration include configurations for carrier operation on a first frequency band, and at least one parameter associated with the second CA configuration is more restrictive than at least one parameter associated with the first configuration. An identifier is received from a network node. The identifier indicates a selected one of the first CA configuration and the second CA configuration to be used by the first wireless device for performing the CA operation. The second CA configuration is selected when a second wireless device is operating or expected to operate using a single carrier configuration on a cell associated with the first frequency band. A transceiver of the first wireless device is configured for performing the CA operation based on the identifier identifying the selected one of the first CA configuration and the second CA configuration.

According to certain embodiments, a wireless device for adapting carrier aggregation (CA) configurations is provided. The wireless device includes a memory storing computer-readable instructions for selecting carrier aggregation (CA) configurations and a processor that is operable, when executing the computer-readable instructions, to obtain information about a plurality of CA configurations for a CA operation. The plurality of configurations include at least a first CA configuration and a second CA configuration that are configurations for carrier operation on a first frequency band. At least one parameter associated with the second CA configuration is more restrictive than at least one parameter associated with the first configuration. An identifier is received from a network node. The identifier indicates a selected one of the first CA configuration and the second CA configuration to be used by the first wireless device for performing the CA operation. The second CA configuration is selected when a second wireless device is operating or expected to operate using a single carrier configuration on a cell associated with the first frequency band. A transceiver of the first wireless device is configured for performing the CA operation based on the identifier identifying the selected one of the first CA configuration and the second CA configuration.

Some embodiments of the disclosure may provide one or more technical advantages. For example, an advantage may be that the methods and systems ensure that a network node can successfully operate a CA-capable wireless device in any CA which involves FDD and TDD frequency bands close to each other in frequency. As another example, an advantage may be that a network node can successfully operate a CA-capable wireless device in any CA involving TDD bands with different UL/DL TDD configurations even where the TDD bands are close to each other in frequency. As still another example, an advantage may be that the methods and systems enhance user performance since CA can be effectively used even where CA uses FDD and TDD frequency bands or TDD bands (with different UL/DL TDD configurations) that are close to each other in frequency. As another example still, an advantage may be that a network node is able to perform legacy operations for wireless devices on such TDD, FDD and unlicensed bands as well as CA operations for CA-capable wireless devices. As a result, overall system performance and wireless device performance is enhanced.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIGS. 1A-1B are schematic diagram illustrating example carrier aggregation scenarios, according to certain embodiments;

DETAILED DESCRIPTION

Figure 2:
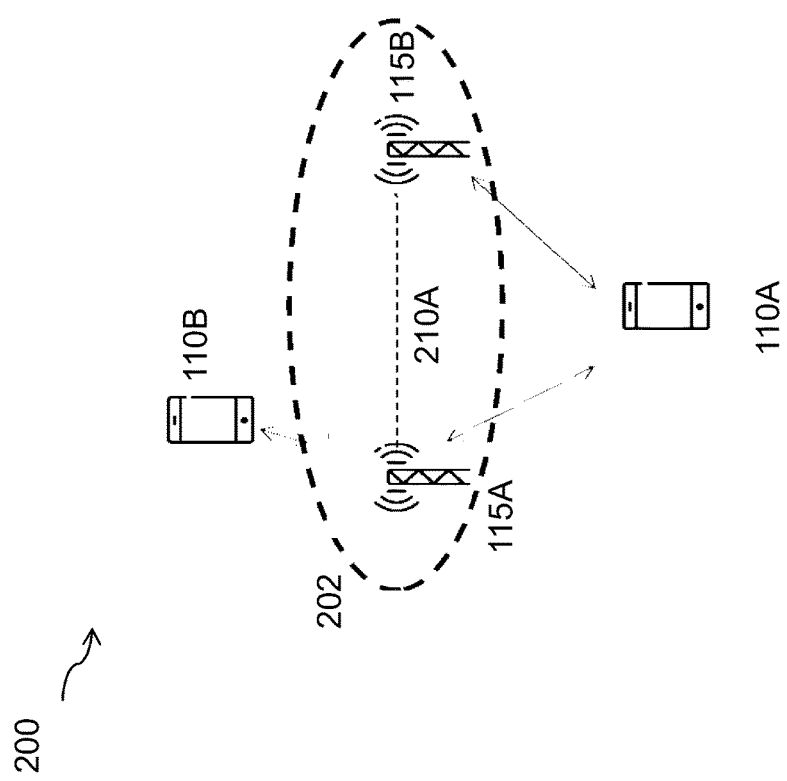
FIG. 2 is a schematic diagram illustrating an example network including wireless devices deploying dual-connectivity, according to certain embodiments.
Figure 3:
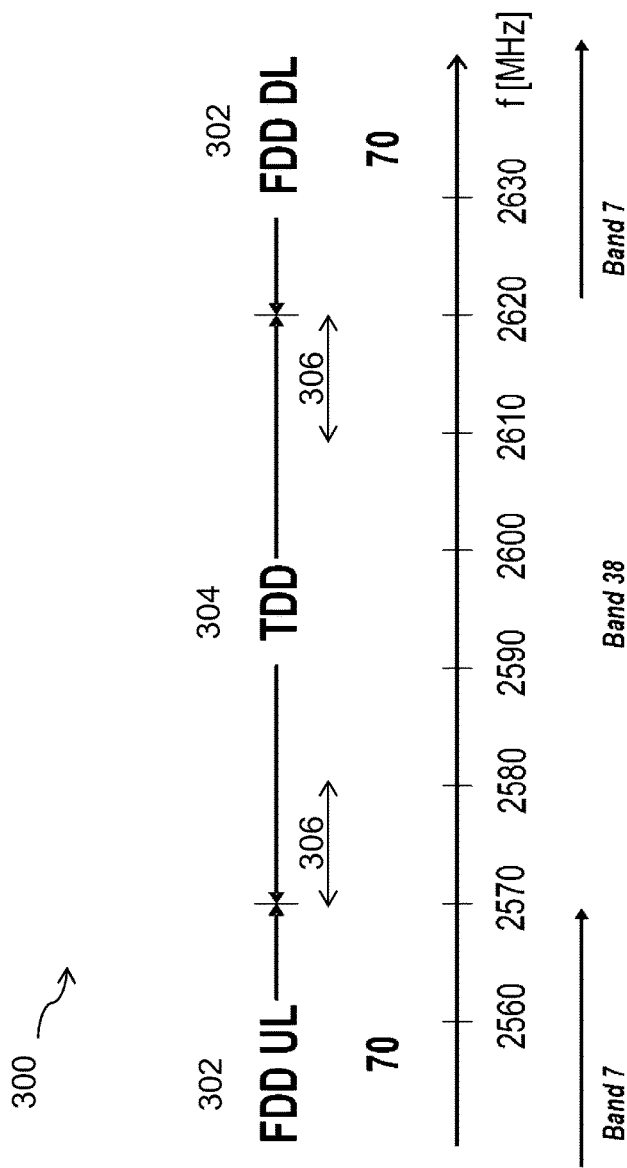
FIG. 3 is a schematic diagram illustrating an example frequency division duplex (FDD) and time division duplex (TDD) coexistence scenario having a guard band of 10 MHz between FDD and TDD systems, according to certain embodiments.
Figure 4:
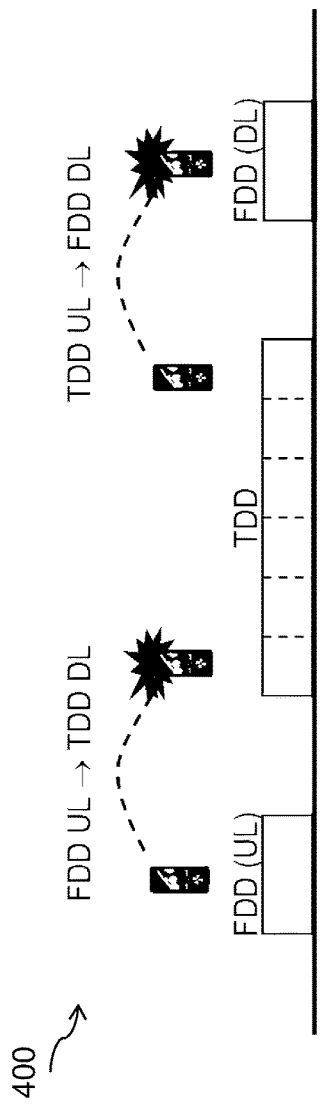
FIG. 4 is a schematic diagram illustrating example wireless device-to-wireless device interference between TDD and FDD systems, according to certain embodiments.
Figure 5:
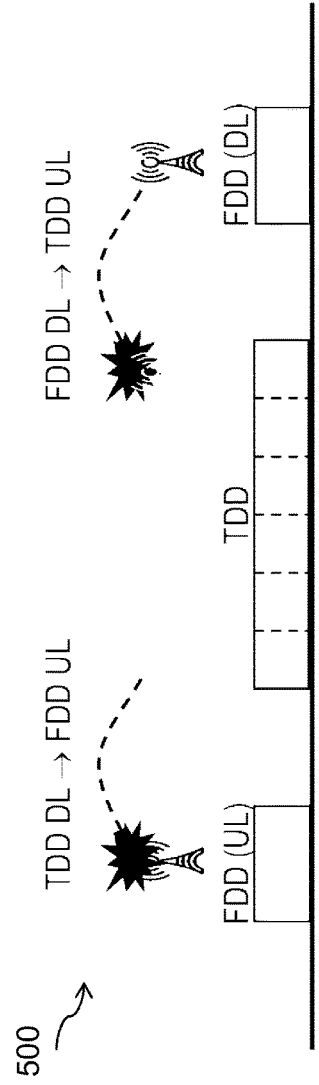
FIG. 5 is a schematic diagram illustrating example network node-to-network node interference between TDD and FDD systems, according to certain embodiments.
Figure 6:
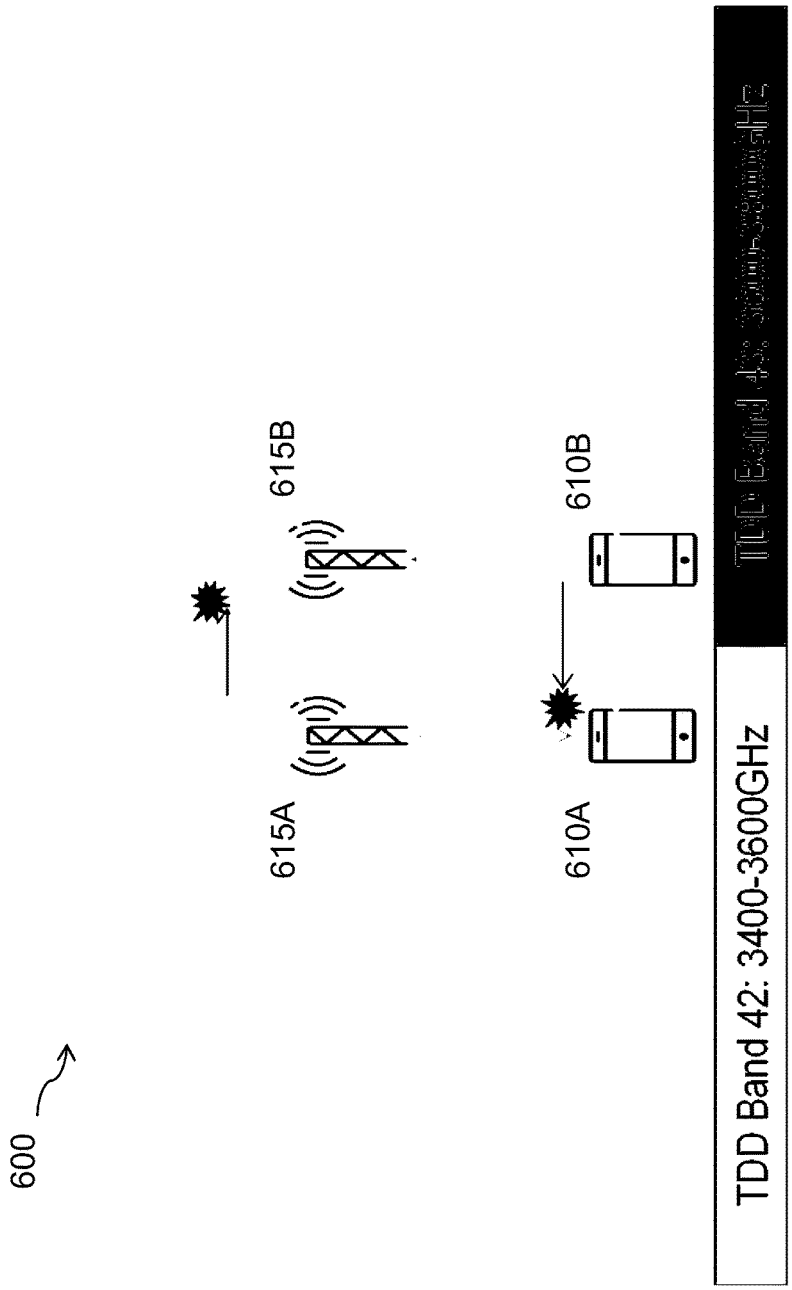
FIG. 6 is a schematic diagram illustrating example interference between TDD and TDD systems operating in adjacent bands, according to certain embodiments.
Figure 7:
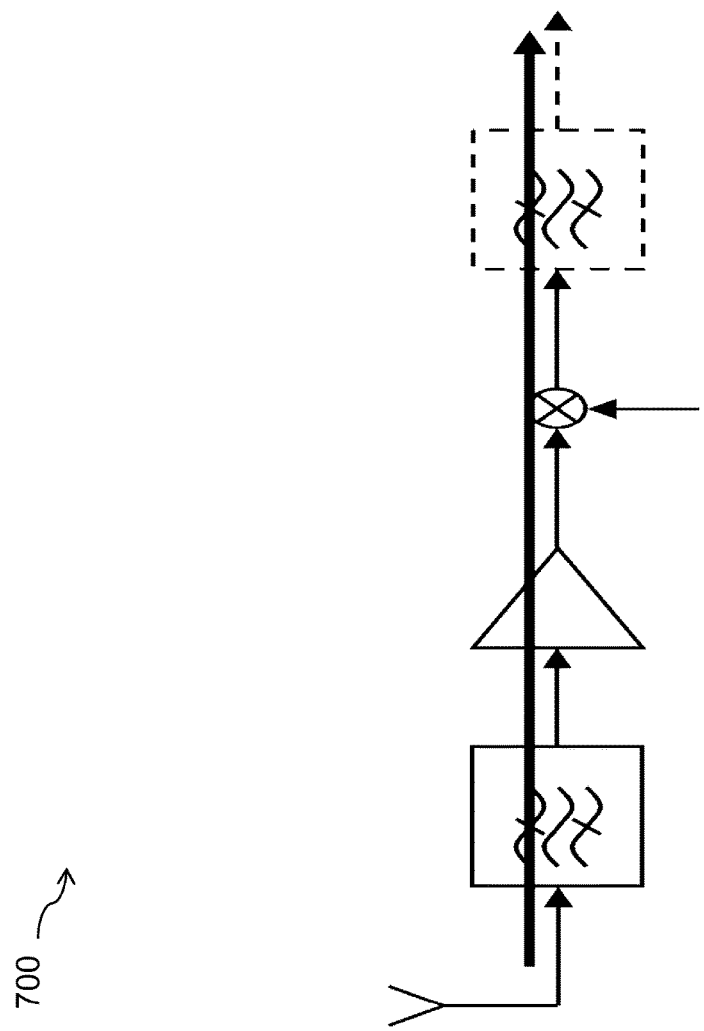
FIG. 7 is a schematic diagram illustrating example transmitter leakage signals, according to certain embodiments.
Figure 8:
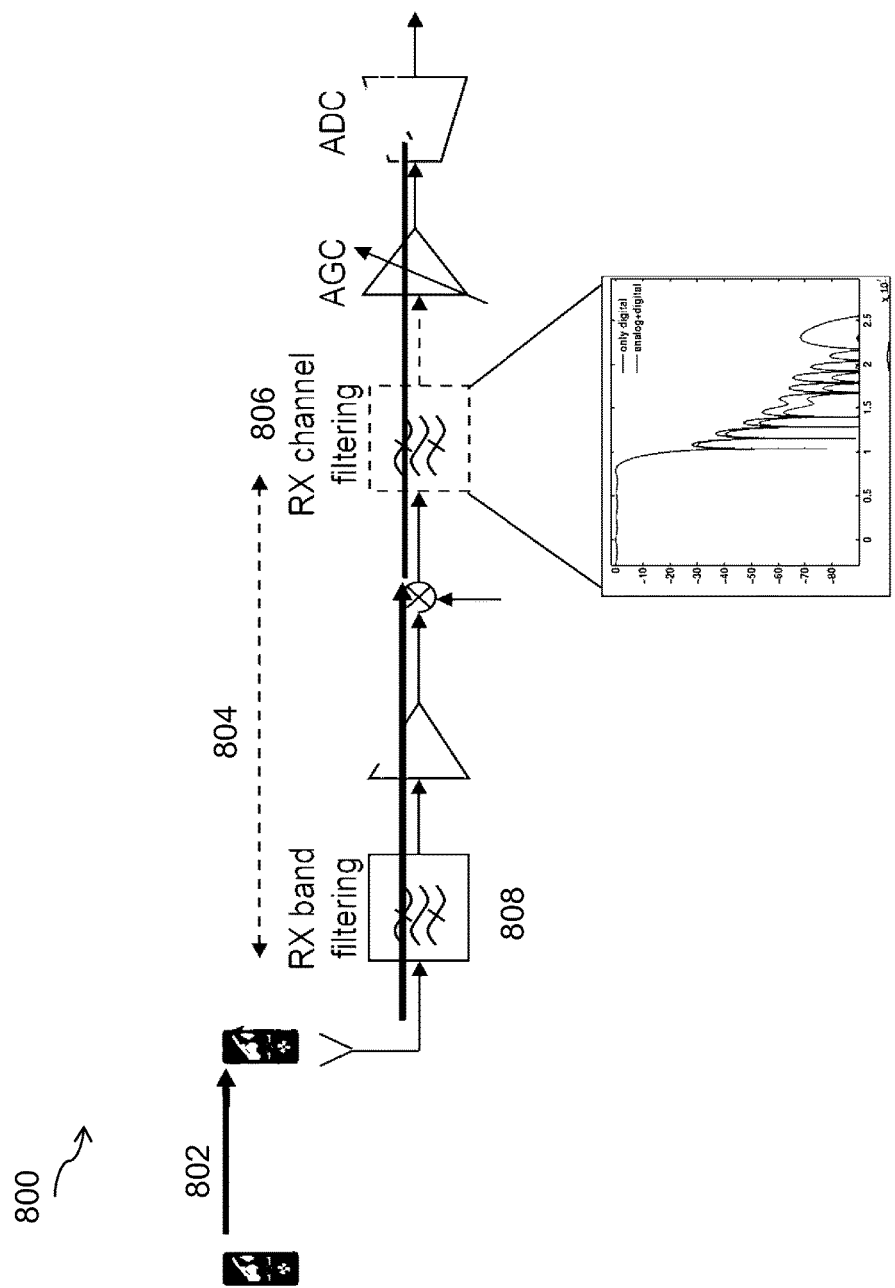
FIG. 8 is a schematic diagram illustrating the impact of strong interfering signals at a victim receiver due to imperfect receiver filtering, according to certain embodiments.

According to certain embodiments, a carrier aggregation (CA) capable wireless device may be configured to operate in CA band combination involving frequency division duplex (FDD) and time division duplex (TDD) frequency bands which are adjacent or very close to each to each other in frequency domain. Examples of such bands are LTE FDD band 7 and LTE TDD band 38, which are adjacent to each other. As a result, uplink (UL) and downlink (DL) operations in these bands may degrade or even disrupt operation of other wireless devices operating in these bands. A similar situation also arise if different UL/DL TDD configurations are used in different TDD bands or carriers in the same band, which are adjacent or close to each other, e.g. band 42 and band 43 TDD bands (see FIG. 6), or different LTE cells operating in unlicensed bands. A legacy single carrier operation involves both UL and DL transmission in the serving cell of the wireless device. Therefore any legacy single carrier operation in these bands may seriously degrade or even disrupt CA operation involving band 7 and band 38 even if there is only DL SCells in these bands. According to certain embodiments described herein, techniques are provided to ensure that the CA operation involving adjacent FDD and TDD bands, such as band 7 and band 38, take place without any disruption.

Figure 9:
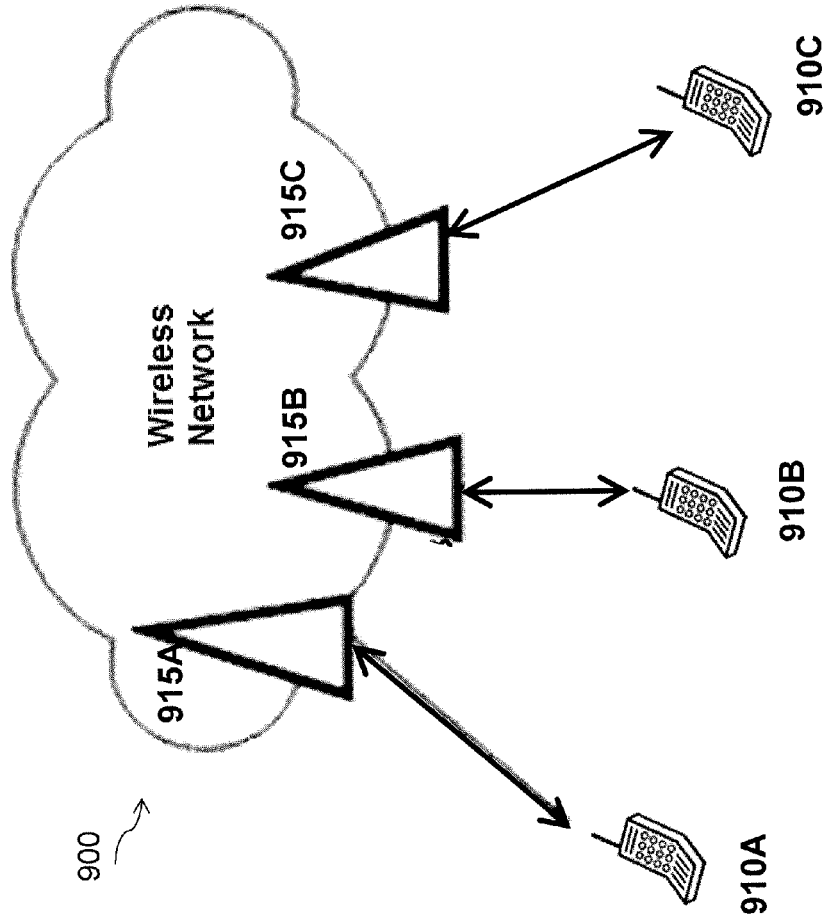
FIG. 9 is a schematic diagram illustrating an example wireless network, according to certain embodiments.

FIG. 9 is a block diagram illustrating embodiments of a radio network 900, according to certain embodiments. Network 900 includes one or more wireless devices 910A-C (which may be interchangeably referred to as wireless devices 910), network nodes 915A-C (which may be interchangeably referred to as network nodes or eNodeBs (eNBs) 915). A wireless device 910 may communicate with a radio network node 915 over a wireless interface. For example, wireless device 910 may transmit wireless signals to a radio network node 915 and/or receive wireless signals from radio network node 915. The wireless signals may contain voice traffic, data traffic, control signals, and/or any other suitable information. In some embodiments, an area of wireless signal coverage associated with a network node 915 may be referred to as a cell. In some embodiments, wireless devices 910 may have device-to-device capability. Thus, wireless devices 910 may be able to receive signals from and/or transmit signals directly to another wireless device 910. For example, wireless device 910A may be able to receive signals from and/or transmit signals to wireless device 910B.

In certain embodiments, network nodes 915 may interface with a radio network controller (not shown). The radio network controller may control network nodes 915 and may provide certain radio resource management functions, mobility management functions, and/or other suitable functions. The radio network controller may interface with a core network node, in certain embodiments. For example, in certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionality for wireless devices 910. Wireless device 910 may exchange certain signals with the core network node using the non-access stratum layer. In non-access stratum signaling, signals between wireless device 910 and the core network node may be transparently passed through the radio access network.

The terms wireless device 910 and network node 915, as used herein, are considered general terms and are intended to be considered as non-limiting. Likewise, the term UE should not be considering non-limiting. For example, "network node" may correspond to any type of radio network node or any network node, which communicates with wireless device 910 and/or another network node 915. Examples of network nodes 915 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 915 and/or with another wireless device 910 in a cellular or mobile communication system. Examples of wireless devices 910 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

In certain embodiments, the terms first and second may be used to distinguish one network node from another network node, one wireless device from another wireless device, or one wireless device from a network node. Likewise, in certain embodiments, first node and second node may be used where first node can be a network node and a second network node can be a wireless device. The terms first and second should not be construed as implying a hierarchical relation between any two components. For example, first node may be network node and a second node may be a wireless device. The first node and second node may also be interchangeable called in general "eNodeB" could be considered as device 1 and "UE" device 2, and these two devices communicate with each other over some radio channel. Example embodiments of wireless devices 910, network nodes 915, and other network nodes (such as radio network controller or core network node) are described in more detail below with respect to FIGS. 10, 13, and 16, respectively.

Although FIG. 9 illustrates a particular arrangement of network 900, the present disclosure contemplates that the various embodiments described herein may be applied to a variety of networks having any suitable configuration. For example, network 900 may include any suitable number of wireless devices 910 and network nodes 915, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Figure 10:
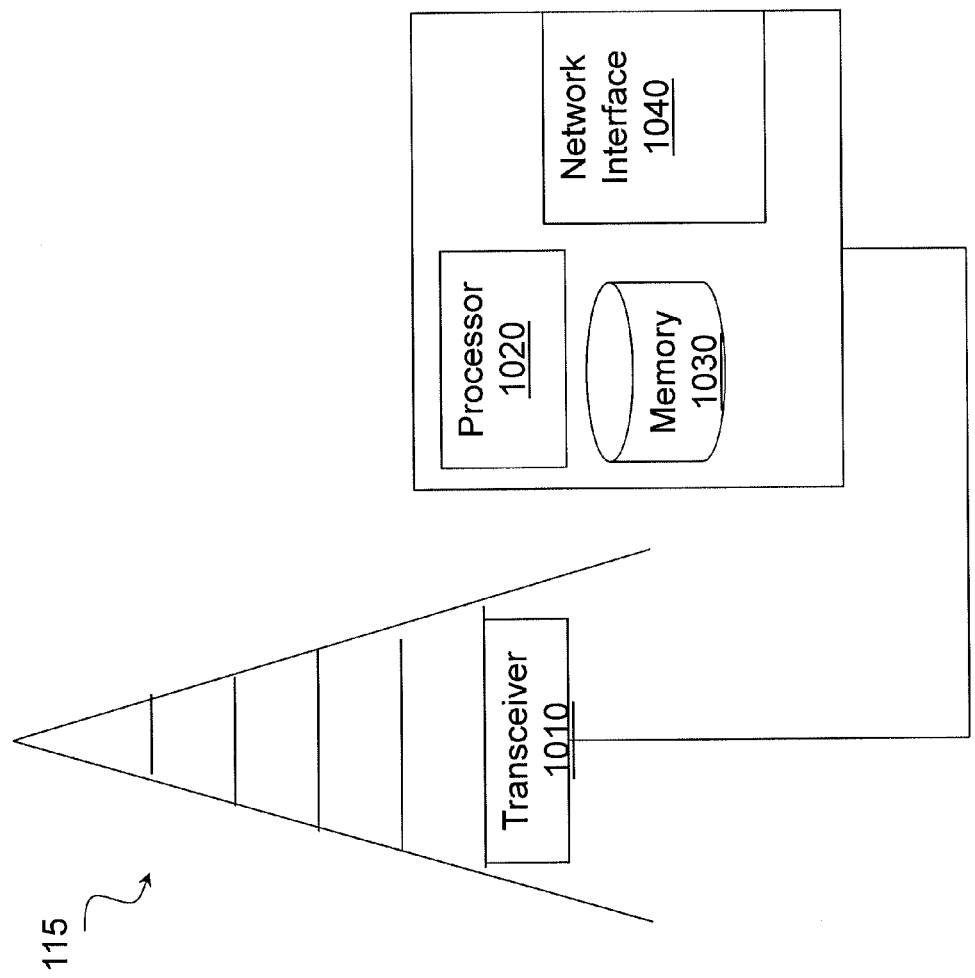
FIG. 10 is a schematic diagram illustrating an example network node for selecting carrier aggregation (CA) configurations, according to certain embodiments.

FIG. 10 is a schematic diagram illustrating an example network node 915. As described above, examples of a network node 915 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Network nodes 915 may be deployed throughout network 900 as a homogenous deployment, heterogeneous deployment, or mixed deployment. A homogeneous deployment may generally describe a deployment made up of the same (or similar) type of radio network nodes 915 and/or similar coverage and cell sizes and inter-site distances. A heterogeneous deployment may generally describe deployments using a variety of types of radio network nodes 915 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 915 may include one or more of transceiver 1010, processor 1020, memory 1030, and network interface 1040. In some embodiments, transceiver 1010 facilitates transmitting wireless signals to and receiving wireless signals from wireless device 910A-C (e.g., via an antenna), processor 1020 executes instructions to provide some or all of the functionality described above as being provided by a radio network node 1015, memory 1030 stores the instructions executed by processor 1020, and network interface 1040 communicates signals to backend network components, such as a gateway, switch, router, Internet, Public Switched Telephone Network (PSTN), core network nodes, radio network controllers, and other network components.

Processor 1020 may include any suitable combination of hardware and software implemented in one or more modules to execute instructions and manipulate data to perform some or all of the described functions of radio network node 915. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for radio network node 915, send output from radio network node 915, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of radio network node 1015 may include additional components beyond those shown in FIG. 10 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

In certain embodiments, at least a first network node 915A capable of operating cells on carrier frequencies belonging to at least two frequency bands namely a first frequency band and a second frequency band operate in the same geographical area. In some embodiments, the first and the second frequency bands may be operated by different network nodes 915. For example, the first frequency band may be operated by a first network node 915A, and the second frequency band may be operated by a second network node 915B. Different network nodes 915 may or may not be co-located at the same physical location, in particular embodiments.

In some embodiments, one or more network nodes 915 may operate cells on carrier frequencies belonging to more than two frequency bands. For example, a first network node 915 may operate cells on carrier frequencies belonging to a first, a second, and a third frequency band in the same geographical area. In a particular example, the first, second and third frequency bands may include any combination of E-UTRA FDD frequency band 20 (800 MHz range), E-UTRA FDD frequency band 7 (2.6 GHz range), and E-UTRA TDD frequency band 38 (2.6 GHz range).

Figure 11:
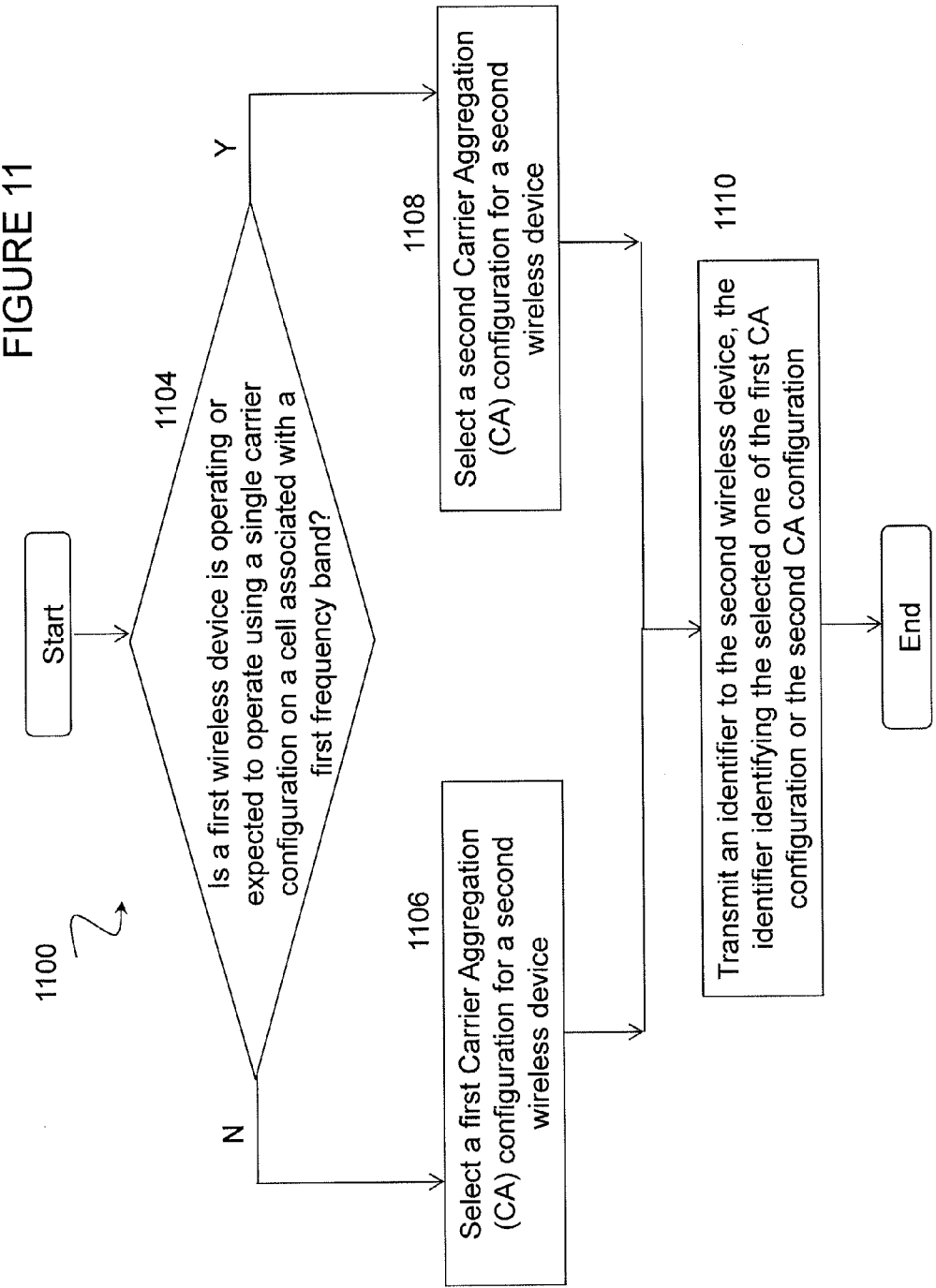
FIG. 11 is a process flow diagram of an example method for selecting CA configurations by a network node, according to certain embodiments.

A first network node 915 or a plurality of network nodes operating different frequency bands may further be capable of configuring one or more wireless devices 910 that are CA-capable by selecting a CA configuration for a wireless device. FIG. 11 illustrates an example method 1100 for selecting CA configurations by a network node 915. The method begins at step 1104 when network node 915 determines emissions characteristics associated with a first wireless device 910A. For example, network node 915 may determine whether a first wireless device 910A is operating or expected to operate using a single carrier configuration on a cell associated with a first frequency band.

In certain embodiments, the first frequency band may include a FDD frequency band and a TDD band that are adjacent to one another. In other embodiments, the first frequency band may include a first TDD frequency band and a second TDD frequency band that are adjacent to one another. Additionally or alternatively, network node 915 may determine, at step 1104, whether adjacent channel interference between radio nodes (e.g., UE-to-UE interference, BS-to-BS interference, UE-to-BS interference, and/or BS-to-UE interference) across component carriers of the bands involved in CA exceed a threshold.

The identification of whether a first wireless device 910A is operating or expected to operate using a single carrier configuration on a cell associated with the first frequency band may be determined using a number of different mechanisms. For example, in certain embodiments, the network node 915 may receive an explicit indication from a wireless device 910A on a cell operating on a band involved in the CA operation. Alternatively, network node 915 may receive any UL signal, such as SRS, random access, or another signal, from one or more wireless devices 910 on a cell operating on a band involved in the CA operation. An UL signal may be indicative of the fact that serving cell has both DL and UL components.

As another example, the network node 915 may determine that there is a single carrier operation on one or more bands involved in the CA based on internal information, such as stored data, where, for example, the network node 915 has configured one or more wireless device 910 with legacy operation.

As still another example, the network node 915 may receive an indication from another network node that there are one or more wireless devices 910 with legacy operation on certain bands. Specifically, a network node operating cell(s) on band 7 and/or band 38 indicate to the first network node 915 that there are wireless devices 910 using only PCell on band 7 and/or band 38. As still another example, network node 915 may make an implicit determination of legacy operation by assessing the signal quality of a wireless device 910 operating in CA. For example, network node 915 serving a wireless device 910 configured with inter-band CA in band 20, band 7 and band 38, may determine that the DL signal quality measured by the wireless device on SCell(s) on band 7 and/or on band 38 is below a threshold. This may indicate that legacy wireless device operation on band 7 and/or band 38 has degraded the CA-capable wireless device's signal quality on these bands.

Finally, in still another example, the determination of step 1104 may be based on system information transmitted in one or more cells on bands involved in CA. For example, if access barring is not configured or activated in serving cells on band 8 and/or band 38, network node 915 configuring wireless devices 910 with CA may assume that legacy wireless devices may be camp on these cells. These wireless devices 910 may also perform UL transmissions when going into connected state and/or when doing for example tracking area update.

If it is determined at step 1104 that the first wireless device 910A is not operating or expected to operate using the single carrier configuration on the cell associated with the first frequency band, network node 915 selects a first CA configuration for a second wireless device 910B. Conversely, if it is determined at step 1104 that first wireless device 910A is operating or expected to operate using a single carrier configuration on a cell associated with a first frequency band, network node 915 selects a second CA configuration for the second wireless device. The first CA configuration and the second CA configuration comprise configurations for carrier operation on the first frequency band.

In certain embodiments, at least one parameter associated with the second CA configuration is more restrictive than at least one parameter associated with the first configuration. Thus, a more restrictive CA configuration may be selected when it is determined that first wireless device 910A is operating or expected to operate using the single carrier configuration on the cell associated with the first frequency band.

In a first example, the at least one parameter may be a frequency range such that the second CA configuration has a more limited allowed frequency range than an allowed frequency range of the first CA configuration. In a second example, the at least one parameter may be an allowed number of physical channels for CA operation by the second wireless device. Specifically, the allowed number of physical channels for the second CA configuration may be less than the allowed number of physical channels associated with the first CA configuration. In a third example, the at least one parameter may be an allowed power range such that the second CA configuration has a more limited allowed power range than allowed power range of the first CA configuration. In a fourth example, the at least one parameter may correspond to a maximum CA configurations in terms of number of CCs and/or serving cell bandwidths. For example, if network node 915 selects the first CA configuration then second wireless device 910B can be configured with a CA configuration which is not larger than the first CA configuration.

Additionally, the first and the second CA configurations may typically be associated with one or more specific type of CA. For example, the CA configurations may be defined for inter-band CA for band 20, band 7 and band 38. In yet another example, the CA configurations may be defined for inter-band CA for band 20, band 7 and band 38 provided PCell belong to band 20 whereas SCells with only DL component are defined for band 7 and band 38. As another example, the CA configurations may be defined for inter-band CA for band 7 and band 38.

In certain embodiments, the at least first and the second CA configurations may be pre-defined and can be associated with a first pre-defined and a second pre-defined identifiers respectively. Accordingly, at step 1110, the network node 915 may transmit an identifier to second wireless device 910B that corresponds with the selected one of the first CA configuration or the second CA configuration that second wireless device 910B should use. Thus, if network node 915 selects first CA configuration at step 1106, network node 915 sends an identifier associated with the first CA configuration to second wireless device 910B. Conversely, if network node 915 selects second CA configuration at step 1108, network node 915 sends an identifier associated with second CA configuration to second wireless device 910B.

In other embodiments, the first and the second CA configurations may not be predefined in the second wireless device 910B. In such a scenario, the selected CA configuration may be determined by the network node 915 and transmitted directly to second wireless device 910B. In still other embodiments, the first CA configuration may be pre-defined and the second CA configuration may be provided directly by network node 915. In a particular embodiment, for example, second wireless device 910B could be preconfigured with a first CA configuration as a default configuration. In the case where network node 915 determines that a more restrictive CA configuration is appropriate due to wireless radio emissions, network node 915 may transmit the second CA configuration to second wireless device 910B when it should use the more restrictive configuration.

In certain embodiments, an example CA configuration may include two or more serving cells, such as a PCell and at least one SCell, with the same or different channel bandwidths. In one example, CA-capable wireless device 910 may aggregate serving cells belonging to the first and second bands using inter-band CA of Band 7 and Band 38. In general, at least the PCell is associated with both UL and DL operation also known as DL PCell and UL PCell. While the SCells have at least a DL component, the SCells may or may not have an UP component. In another example, the CA configuration may comprise a PCell and two or more SCells with only DL components. In a particular embodiment, for example, the CA configuration may include a PCell belonging to band 20, a first SCell with only DL component belonging to band 7, and a second SCell with only a DL component belonging to band 38.

In certain other embodiments, the CA configuration may enable the second wireless device 910B to maintain simultaneous connections with the network node 915A and at least one secondary network node 915B. Thus, the CA configurations may enable the second wireless device 910B to operate with dual connectivity.

In order to ensure appropriate wireless device behavior and network operation for certain CA band combinations (e.g. inter-band CA in bands 20, 38 and 7), two or more CA configurations associated with such band combination may be pre-defined by a standard. The use of these CA configurations may also be linked with the interference and/or legacy operational scenarios or mode of operations, in certain embodiments. The UE radio requirements (e.g. UE RF transmitted and RF receiver requirements) associated with different pre-defined CA configurations may also be standardized. It may also be pre-defined that the CA-capable wireless device 910 may comply with these pre-defined requirements provided these CA configurations are used for CA operations in accordance with the pre-defined rules or conditions e.g. use more stringent CA configuration when one or more legacy wireless device operates on certain bands associated with the corresponding CA band combination.

Pre-defined rules may include one or more restricted or reduced or limited CA configurations such as those described in more detail in the particular examples below. These may include restricted channel frequencies or frequency numbers or channel numbers for SCell of a CA-capable wireless device 910 when configured, e.g. a "restricted set of channel numbers" (aka EARFCN, ARFCN etc) to be used for configuration of SCells. Additionally or alternatively, the restricted or reduced CA configurations may include restricted DL power settings for transmitted signals within a channel bandwidth of a serving cell (e.g. SCell) of the CA-capable wireless device. For example, a "frequency dependent (resource block) DL power restriction" within the transmission bandwidth configuration of an E-UTRA carrier may be included. The DL power restrictions may also be advertised in the system information of the carrier since the power restrictions also affect wireless devices not configured for CA.

As another variation, it may be recognized that more than two CA configurations may be possible for selection by network node 915. For example, in certain embodiments, the network node 915 may select from first, second, and third CA configurations. As described above, the at least one parameter associated with the second CA configuration may be more restrictive than the at least one parameter associated with the first CA configuration. Additionally, the at least one parameter associated with the second CA configuration may be more or less restrictive than the corresponding parameter associated with the third CA configuration. In one particular embodiment, for example, a CA-capable wireless device 910 may be capable of aggregating serving cells belonging to inter-band CA of band 20, band 7, and band 38.

In certain embodiments, the method 1100 described herein may also be applicable for inter-band CA involving only TDD bands if different UL/DL TDD configurations are used in different bands which are close to each other in frequency or on different carriers within the same band. One example may include inter-band CA with LTE TDD band 42 (3.4-3.6 GHz) and LTE TDD band 43 (3.6-3.8 GHz) where different TDD configurations can be used. This may also be called unsynchronized TDD operation since carriers within the same TDD band or across different TDD bands use different UL/DL configurations.

Other actions may be taken by network node 915 in lieu of or in addition to the transmission of CA identifiers or configuration information step 1110. For example, in certain embodiments, network node 915 may reconfigure or perform cell change of one or more wireless devices operating with single carrier operation. Specifically, network node 915 may perform a handover of a legacy wireless device on a cell belonging to the carrier or band which does not cause interference to the CA-capable wireless device 910. As another example, network node 915 may adapt scheduling of uplink and/or downlink transmissions for the CA-capable wireless device on the adapted CA configuration. For example, network node 915 may allocate UL and/or DL resource blocks with a transmit power of at least X dB below a maximum allowed power level, in a particular embodiment.

Figure 12:
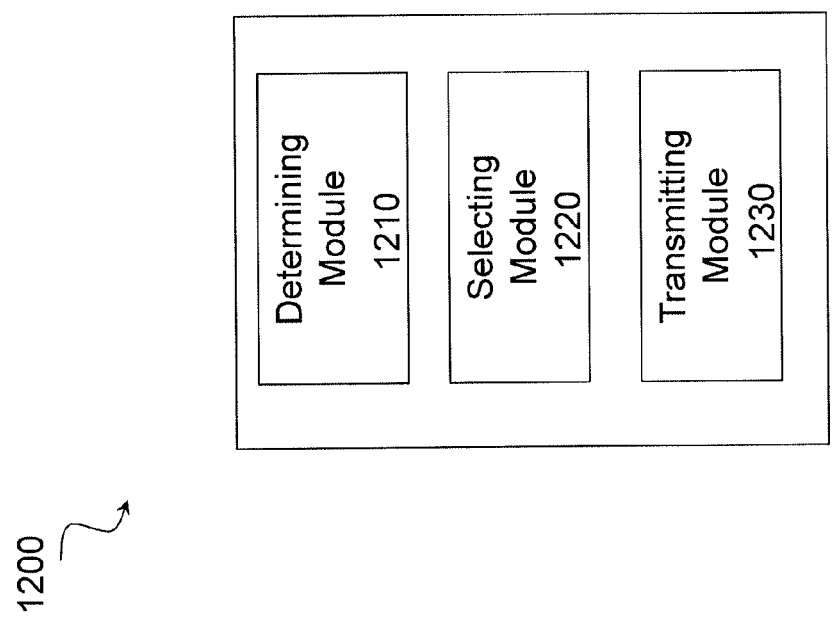
FIG. 12 is a schematic diagram illustrating an example virtual computing apparatus for selecting CA configurations, according to certain embodiments.

FIG. 12 illustrates an example virtual computing apparatus 1200 for selecting and or adapting CA configurations. In certain embodiments, virtual computing apparatus 1200 may include modules for performing operations similar to those described above with regard to the method of FIG. 11. Thus, as depicted, virtual computing apparatus 1200 includes at least one determining module 1202, at least one selecting module 1204, and at least one transmitting module 1206. It is recognized, however, that virtual computing apparatus 1200 may include more or fewer modules as appropriate for selecting CA configurations.

Determining module 1202 may perform the determining functions of network node 915, as described herein. For example, determining module 1202 may determine whether a first wireless device 910A is operating or expected to operate using a single carrier configuration on a cell associated with a first frequency band.

Selecting module 1204 may perform the selecting functions of network node 915, as described herein. For example, if it is determined that first wireless device 910A is not operating or expected to operate using a single carrier configuration on a cell associated with a first frequency band, selecting module 1204 may select a first CA configuration for a second wireless device 910B. Conversely, if it is determined that first wireless device 910A is operating or expected to operate using a single carrier configuration on a cell associated with a first frequency band, selecting module 1204 may select a second CA configuration for a second wireless device 910B. As described above, the first and second CA configurations may include configurations for carrier operation on the first frequency band. Additionally, at least one parameter associated with the second CA configuration may be more restrictive than the corresponding parameter associated with the first CA configuration. Thus, a more restrictive CA configuration may be selected when it is determined that first wireless device 910A is operating or expected to operate using the single carrier configuration on the cell associated with the first frequency band.

Transmitting module 1206 may perform the transmitting functions of network node 915, as described herein. For example, transmitting module 1206 may transmit an identifier to second wireless device 910B. The identifier may identify the particular one of the first and second CA configurations that was identified by selecting module 1204.

Other embodiments of the virtual computing apparatus may include additional components beyond those shown in FIG. 12 that may be responsible for providing certain aspects of the network node's functionality, including any of the functionality described above and/or any additional functionality (including any functionality necessary to support the solution described above).

Figure 13:
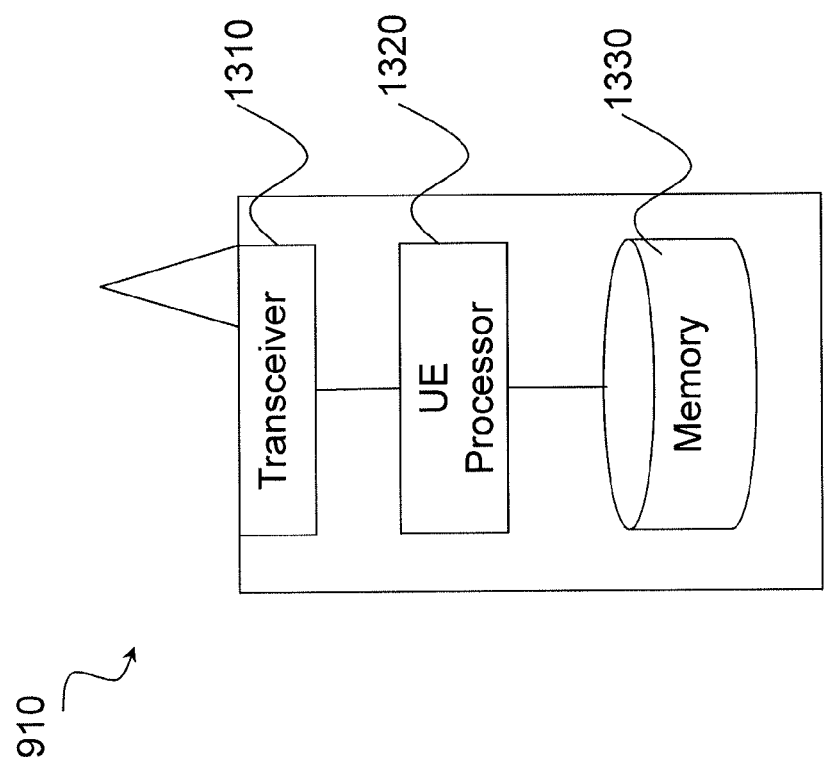
FIG. 13 is a schematic diagram illustrating an example wireless device for adapting CA configurations, according to certain embodiments.

As described herein, a wireless device 910 may be capable of adapting CA configurations in response to information received from network node 915. FIG. 13 illustrates an example wireless device 910 for adapting CA configurations according to certain embodiments. As described above, examples of wireless device 910 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 910 may also be referred to as user equipment (UE), a station (STA), a device, or a terminal in some embodiments.

As illustrated, wireless device 910 includes transceiver 1310, processor 1320, and memory 1330. In some embodiments, transceiver 1310 facilitates transmitting wireless signals to and receiving wireless signals from network node 915 (e.g., via an antenna), processor 1320 executes instructions to provide some or all of the functionality described above as being provided by wireless device 1310, and memory 1330 stores the instructions executed by processor 1320.

Processor 1320 may include any suitable combination of hardware and software implemented in one or more modules to execute instructions and manipulate data to perform some or all of the described functions of wireless device 910. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 910 may include additional components beyond those shown in FIG. 13 that may be responsible for providing certain aspects of the wireless device's functionality, including any of the functionality described above and/or any additional functionality (including any functionality necessary to support the solution described above).

Figure 14:
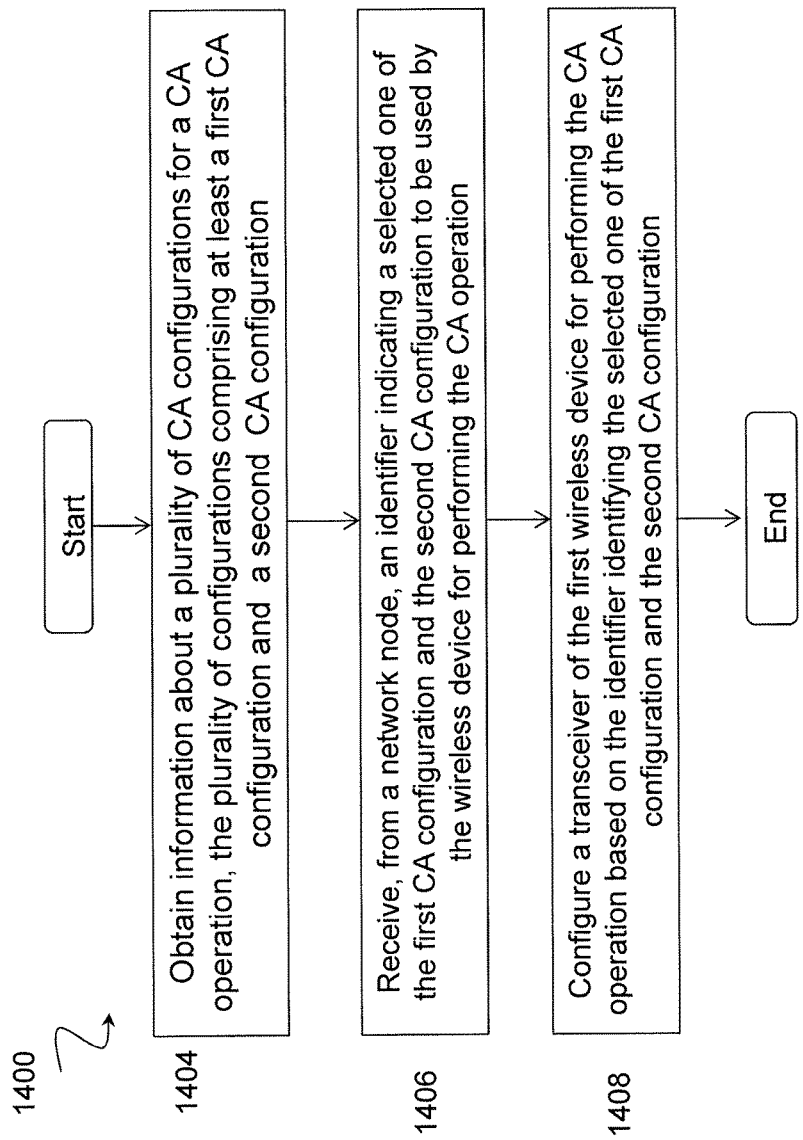
FIG. 14 is process flow diagram of an example method for adapting CA configurations by a wireless device, according to certain embodiments.

FIG. 14 illustrates an exemplary method 1400 performed by a first wireless device 910A for adapting CA configurations, according to certain embodiments. As described above, network node 915 may preconfigure first wireless device 910A with the CA configurations. Thus, the method begins at step 1404 when the first wireless device 910A obtains information about a plurality of CA configuration for CA operation on a first frequency band. In certain embodiments, the CA configurations may be associated with identifiers. For example, first and second CA configurations may be associated with ID #0 and ID #2, respectively. In a particular embodiment, the CA information may include first and second CA configurations. In other embodiments, the CA information may include more than two CA configurations. For example, the CA information may include first, second, and third CA configurations, in a particular embodiment.

At step 1406, first wireless device 910A receives an identifier from network node 915. The identifier may identify which of the plurality of CA configurations first wireless device 910A should use for the CA operation. For example, the identifier may identify a first CA configuration or a more restrictive CA configuration, such as for example, a second CA configuration. As described above, the identifier may be selected by the network node 915 based on whether another wireless device, herein referred to as second wireless device 910B is operating or expected to operate using a single carrier configuration on a cell associated with the first frequency band. Specifically, and as described in more detail above, at least one parameter associated with a second CA configuration is more restrictive than at least one parameter associated with a first configuration. Thus, a more restrictive CA configuration may be selected when it is determined that the second wireless device 910B is operating or expected to operate using the single carrier configuration on the cell associated with the first frequency band.

For example, in a particular embodiment, the at least one parameter may be a frequency range such that the second CA configuration has a more limited allowed frequency range than an allowed frequency range of the first CA configuration. As another example, in a particular embodiment, the at least one parameter may be an allowed number of physical channels for CA operation by the first wireless device 910A. Specifically, the allowed number of physical channels for the second CA configuration may be less than the allowed number of physical channels associated with the first CA configuration. In still another example, the at least one parameter may be an allowed power range such that the second CA configuration has a more limited allowed power range than allowed power range of the first CA configuration.

At step 1408, first wireless device 910A configures transceiver 1302 of first wireless device 910A for performing the CA operation based on the identifier received from the network node 915. For example, first wireless device 910A may adapt its radio and baseband circuitry to allow first wireless device 910A to receive and transmit signals on serving cells corresponding to the selected CA configuration as indicated by the identifier. Additionally or alternatively, first wireless device 910A may adjust or adapt one or more parameters of its radio receiver for receiving radio signals from one or more serving cells based on the selected CA configuration. For example, if DL transmitted power is restricted then the first wireless device may use a more robust receiver, which is capable of receiving signals with signal quality below a threshold. In a particular embodiment, if DL transmitted power is 3 dB below a maximum transmission power, first wireless device 910A may use a more robust receiver so that signals with SINR or SNR below a threshold are received.

In certain embodiments, an example CA configuration may include two or more serving cells, such as a PCell and at least one SCell, with the same or different channel bandwidths. In one example, CA-capable wireless device 910A may aggregate serving cells belonging to the first and second bands using inter-band CA of Band 7 and Band 38. In general, at least the PCell is associated with both UL and DL operation also known as DL PCell and UL PCell. While the SCells have at least a DL component, the SCells may or may not have an UP component. In another example, the CA configuration may comprise a PCell and two or more SCells with only DL components. In a particular embodiment, for example, the CA configuration may include a PCell belonging to band 20, a first SCell with only DL component belonging to band 7, and a second SCell with only a DL component belonging to band 38.

In certain other embodiments, the CA configuration may enable first wireless device 910A to maintain simultaneous connections with the network node 915A and at least one secondary network node 915B. Thus, the CA configurations may enable the first wireless device 910A to operate with dual connectivity.

In certain embodiments, the method 1400 described herein may also be applicable for inter-band CA involving only TDD bands if different UL/DL TDD configurations are used in different bands which are close to each other in frequency or on different carriers within the same band. One example may include inter-band CA with LTE TDD band 42 (3.4-3.6 GHz) and LTE TDD band 43 (3.6-3.8 GHz) where different TDD configurations can be used. This may also be called unsynchronized TDD operation since carriers within the same TDD band or across different TDD bands use different UL/DL configurations.

Figure 15:
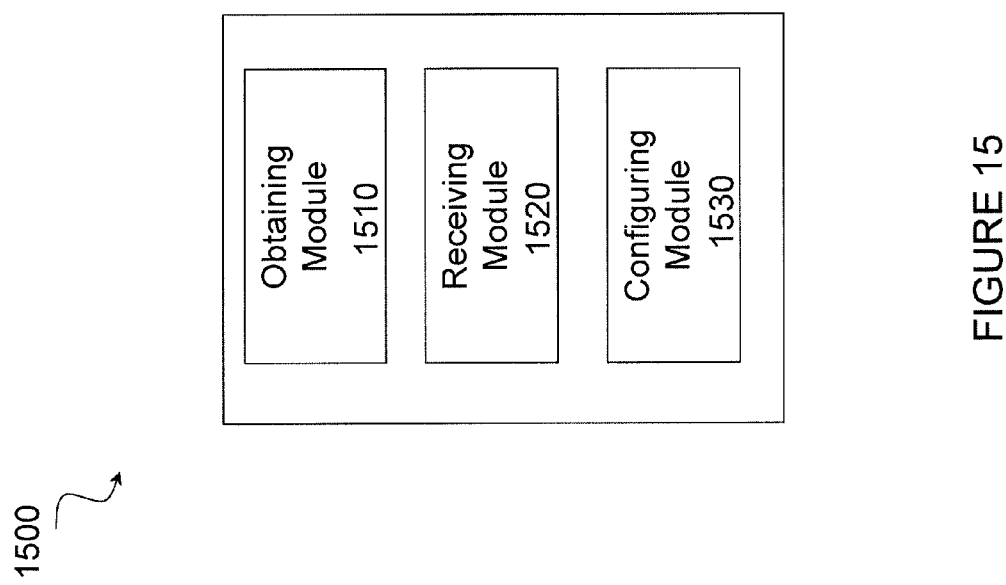
FIG. 15 is a schematic diagram illustrating an example virtual computing apparatus for adapting CA configurations, according to certain embodiments.

FIG. 15 illustrates an example virtual computing apparatus 1500 for selecting or adapting CA configurations, according to certain embodiments. In certain embodiments, virtual computing apparatus 1500 may include modules for performing operations similar to those described above with regard to the method of FIG. 14. Thus, as depicted, virtual computing apparatus 1500 includes at least one obtaining module 1502, at least one receiving module 1504, and at least one configuring module 1506. It is recognized, however, that virtual computing apparatus 1400 may include more or fewer modules as appropriate for adapting CA configurations Obtaining module 1502 may perform the obtaining functions of wireless device 910 for adapting a CA configuration, as described herein. For example, obtaining module 1502 may obtain information about a plurality of CA configuration for CA operation on a first frequency band. In a particular embodiment, the CA information may include first and second CA configurations for carrier operation on a first frequency band, and the second CA configuration may be more restrictive than the first CA configuration. In other embodiments, the CA information may include more than two CA configurations of varying levels of restriction. For example, the CA information may include first, second, and third CA configurations in decreasing levels of restriction, in a particular embodiment.

Receiving module 1504 may perform the receiving functions of wireless device 910, as described herein. For example, receiving module 1504 may receive an identifier from network node 915. The identifier may identify which of the plurality of CA configurations the wireless device 910 should use for the CA operation. For example, the identifier may identify a first CA configuration or a more restrictive CA configuration, such as for example, a second CA configuration.

Configuring module 1506 may perform the configuring functions of wireless device 910, as described herein. For example, configuring module 1506 may configure a transceiver 1302 for performing CA operations based on the identifier identifying the selected one of the first CA configuration and the second CA configuration.

Other embodiments of the virtual computing apparatus may include additional components beyond those shown in FIG. 15 that may be responsible for providing certain aspects of the wireless device's functionality, including any of the functionality described above and/or any additional functionality (including any functionality necessary to support the solution described above).

Figure 16:
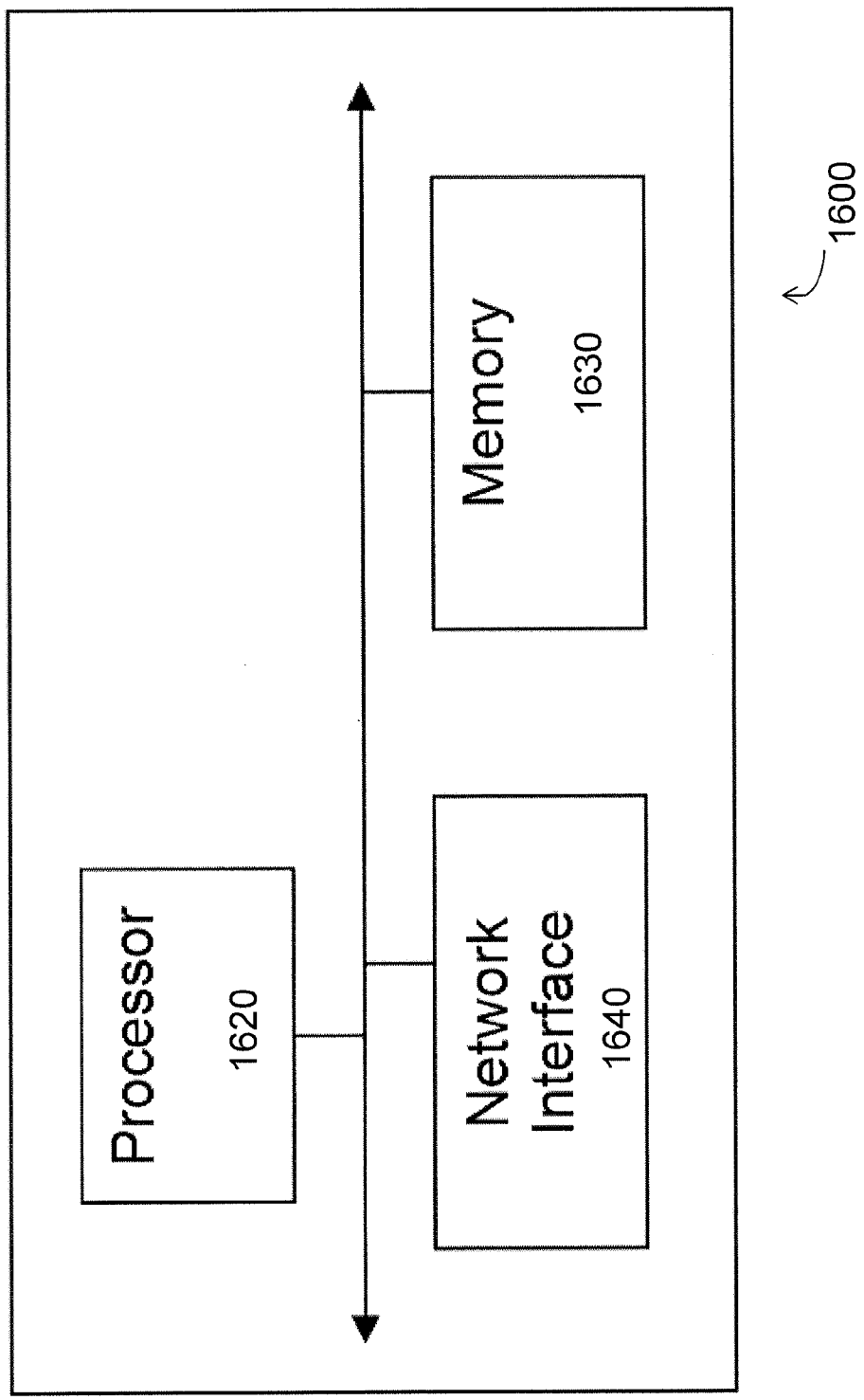
FIG. 16 illustrates an example core network node or radio network controller, according to certain embodiments.

FIG. 16 illustrates an example core network node or radio network controller 1600, according to certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1600 include processor 1620, memory 1630, and network interface 1640. In some embodiments, processor 1620 executes instructions to provide some or all of the functionality described above as being provided by the network node, memory 1630 stores the instructions executed by processor 1620, and network interface 1640 communicates signals to any suitable node, such as a gateway, switch, router, Internet, Public Switched Telephone Network (PSTN), network nodes 915, radio network controllers or core network nodes 1600, etc.

Processor 1620 may include any suitable combination of hardware and software implemented in one or more modules to execute instructions and manipulate data to perform some or all of the described functions of the radio network controller or core network node 1600. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1640 is communicatively coupled to processor 1620 and may refer to any suitable device operable to receive input for the network node, send output from the network node, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of the network node may include additional components beyond those shown in FIG. 16 that may be responsible for providing certain aspects of the network node's functionality, including any of the functionality described above and/or any additional functionality (including any functionality necessary to support the solution described above).

Some example scenarios for the adaption or selection of the CA configuration are provided for example purposes. In a first example, it may be assumed that for inter-band CA for band 20, band 7 and band 38, the following two CA configurations are defined:

First CA configuration: PCell in any part of band 20, DL SCell in any DL passband of band 7 and DL SCell only within the frequency range 2575-2615 MHz of band 38.

Second CA configuration: PCell in any part of band 20, DL SCell in any DL passband of band 7 and DL SCell only within the frequency range 2585-2605 MHz of band 38.

In this first example, the second CA configuration is more constrained, restricted and limiting in terms of maximum CCs, frequency range, maximum physical channels such as resource blocks (RBs) with respect to the first one. Thus, network node 915 configures a CA capable wireless device 910 to operate with CA using the first CA configuration if it is determined that no wireless device 910 is configured for performing legacy or single carrier operation on band 7 and/or band 38. This is because adjacent channel interference at the wireless device 910 and/or network node 915 is expected to be below a certain threshold. On the other hand, if there one or more wireless device 910 performing legacy operation on band 7 and/or band 38, network node 915 configures a CA-capable wireless device 910 to operate with CA using the second CA configuration.

In a second example, it is further assumed that for inter-band CA for band 20, band 7 and band 38 the following three CA configurations are defined:

First CA configuration: PCell in any part of band 20, DL SCell in any DL passband of band 7 and DL SCell only within the frequency range 2575-2615 MHz of band 38.

Second CA configuration: PCell in any part of band 20, DL SCell in any DL passband of band 7 and DL SCell only within the frequency range 2580-2610 MHz of band 38.

Third CA configuration: PCell in any part of band 20, DL SCell in any DL passband of band 7 and DL SCell only within the frequency range 2585-2605 MHz of band 38.

In this second example, the second CA configuration includes an allowed frequency range for at least of the bands that is more constrained, restricted and limiting (e.g. in terms of maximum CCs, and/or maximum allowed frequency range within the passband, physical channels such as RBs etc) with respect to the first CA configuration but less restrictive with respect to the third CA configuration. Specifically, in second CA configuration, the maximum frequency range for band 38 is 2575-1615 MHz (i.e., 30 MHz). Conversely, the maximum frequency range for the first CA configuration is 40 MHz.

In this second example, network node 915 configures a CA-capable wireless device 910 to operate with CA using the first CA configuration if it is determined that i) no wireless device 910 is configured for performing legacy or single carrier operation on band 7 and/or band 38 and ii) the number of CA-capable wireless device 910 using the same band combination (e.g. inter-band CA in band 20, band 7 and band 38) or their subset band combination (e.g. inter-band CA in band 20 and band 7, or band 20 and band 38 or band 7 and band 38) is below a threshold. However, network node 915 configures a CA-capable wireless device 910 to operate with CA using the second CA configuration if it is determined that i) no wireless device 910 is configured for performing legacy or single carrier operation on band 7 and/or band 38 and ii) the number of CA-capable wireless devices using the same band combination (e.g. inter-band CA in band 20, band 7 and band 38) or their subset band combination is above or equal to a threshold. Conversely, if there is one or more wireless devices 910 performing legacy operation on band 7 and/or band 38 then the network node configures a CA-capable wireless device 910 to operate with CA using the third CA configuration.

In a third example, it may be assumed that for inter-band CA for band 20, band 7 and band 38, the following two CA configurations are defined:

First CA configuration: PCell in any part of band 20, DL SCell in any DL passband of band 7 and DL SCell only within the frequency range 2575-2615 MHz of band 38.

Second CA configuration involving only band 20 and band 38: PCell in any part of band 20 and DL SCell in passband of band 38.

Third CA configuration involving only band 20 and band 7: PCell in any part of band 20 and DL SCell in any DL passband of band 7.

In this third example, the second and third CA configurations are more constraint, restricted and limiting (e.g. in terms of maximum bands etc) than the first CA configuration. Accordingly, network node 915 configures a CA-capable wireless device 910 to operate with CA using the first CA configuration if it is determined that no wireless device 910 is configured for performing legacy or single carrier operation on band 7 and/or band 38. On the other hand, if there is one or more wireless device 910 performing legacy operation on band 7 and/or band 38, network node 915 configures a CA-capable wireless device 910 to operate with CA using either the second or the third CA configurations.

In a fourth example, it may be assumed that for inter-band CA for band 20, band 7 and band 38, the following two CA configurations are defined:

First CA configuration: PCell in any part of band 20, DL SCell in any DL passband of band 7 and DL SCell only within the frequency range 2575-2615 MHz of band 38.

Second CA configuration involving only band 20 and band 38: PCell in any part of band 20 and DL SCell only within the frequency range 2585-2605 MHz of band 38.

Third CA configuration involving only band 20 and band 7: PCell in any part of band 20 and DL SCell in any DL passband of band 7.

The fourth example is similar to the third example except that, in the fourth example, the second CA configuration is more restricted than its counterpart in the third example. The example #4 has an advantage in that the adjacent channel interference can be more effectively minimized or reduced while sacrificing a part of spectrum in band 38.

In a fifth example, it may be assumed that for inter-band CA for band 20, band 7 and band 38 the following two CA configurations are defined:

First CA configuration: PCell in any part of band 20, DL SCell in any DL passband of band 7 and DL SCell only within the frequency range 2575-2615 MHz of band 38.

Second CA configuration: No CA is allowed if there is any single carrier operation of a wireless device in band 7 and/or band 38.

This scenario may be considered the most restrictive since no CA is allowed if there is any single carrier operation of a wireless device 910 in band 7 and/or band 38.

In a sixth example, it may be assumed that for inter-band CA for band 20, band 7 and band 38 the following two CA configurations are defined:

First CA configuration: PCell in any part of band 7, DL SCell in any DL passband of band 20 and DL SCell only within the frequency range 2575-2615 MHz of band 38.

Second CA configuration: PCell in any part of band 20, DL SCell in any DL passband of band 7 and DL SCell only within the frequency range 2585-2605 MHz of band 38.

Third CA configuration: PCell in band 7 with UL is between 2500-(2570-$\Delta$) MHz, DL SCell in any DL passband of band 20 and DL SCell only within the frequency range 2570-2620 MHz of band 38. $\Delta$ is the additional frequency separation in MHz needed for spectral isolation of carriers between B7 UL and B38 CC.

In this sixth example, network node 915 configures a CA-capable wireless device 910 to operate with CA using the either the first or the third CA configuration if it is determined that i) no wireless device 910 is configured for performing legacy or single carrier operation on band 7 and/or band 38 and ii) the number of CA-capable wireless devices 910 using the same band combination (e.g. inter-band CA in band 20, band 7 and band 38) or their subset band combination (e.g. inter-band CA in band 20 and band 7, or band 20 and band 38 or band 7 and band 38) is below a threshold. On the other hand, if there are one or more wireless devices 910 performing legacy operations on band 7 and/or band 38, network node 915 configures a CA-capable wireless device 910 to operate with CA using the second CA configuration.

In a seventh example, it may be assumed that for inter-band CA for band 20, band 7 and band 38 the following two CA configurations are defined:

First CA configuration: PCell in any part of band 20, DL SCell in any DL passband of band 7 and DL SCell only within the frequency range 2575-2615 MHz of band 38.

Second CA configuration: PCell in any part of band 20, DL SCell in any DL passband of band 7 and DL SCell only within the frequency range 2575-2615 MHz of band 38 with the DL Scell power reduced in parts of the carrier with lower edge at 2575 MHz.

In the seventh example, the second CA configuration is more constrained, restricted and limiting (e.g. in terms of maximum CCs etc) than the first CA configuration. In the seventh example, network node 915 configures a CA-capable wireless device 910 to operate with CA using the second CA configuration if it is determined that there is risk of blocking a band 38 uplink carrier below 2570 MHz within same or different network node. The DL power of the carrier with lower edge at 2575 MHz is reduced in parts of the channel bandwidth of the said carrier so as to reduce the interferer power into the band 7 uplink. The reduction of power is only needed for downlink frequencies of the band

38 carrier across which the band 7 receiver filter has limited attenuation. Hence the power of DL signals transmitted at the lowest frequencies of the band 38 carrier bandwidth are reduced in power, whereas DL signals transmitted at the higher frequencies of the carrier bandwidth can be transmitted at full power (at these higher frequencies the band 7 receive filter has sufficient rejection). The power restriction applies not only to CA-capable wireless devices 910 and may include all types of transmitter DL signals, e.g. for E-UTRA reference signals (CRS/PSS/SSS/CSI-RS) and DL control channels (PDCCH/E-PDCCH/PCFICH etc). Power restriction can also mean that dedicated data transmission (e.g. PDSCH) is not transmitted at the lowest frequencies of the band 38 carrier.

According to certain embodiments, a method by a network node for selecting carrier aggregation (CA) configurations includes determining whether a first wireless device is operating or expected to operate using a single carrier configuration on a cell associated with a first frequency band. If the first wireless device is not operating or expected to operate using a single carrier configuration on a cell associated with a first frequency band, a first CA configuration is selected for a second wireless device. Conversely, if the first wireless device is operating or expected to operate using a single carrier configuration on a cell associated with a first frequency band, a second CA configuration is selected for the second wireless device. The first CA configuration and the second CA configuration include configurations for carrier operation on the first frequency band, and at least one parameter associated with the second CA configuration is more restrictive than at least one parameter associated with the first configuration. An identifier is transmitted to the second wireless device to identify the selected one of the first CA configuration or the second CA configuration.

According to certain embodiments, a network node includes a memory storing computer-readable instructions for selecting carrier aggregation (CA) configurations and a processor that is operable, when executing the computer-readable instructions, to determine whether a first wireless device is operating or expected to operate using a single carrier configuration on a cell associated with a first frequency band. If the first wireless device is not operating or expected to operate using a single carrier configuration on a cell associated with a first frequency band, a first CA configuration is selected for a second wireless device. Conversely, if the first wireless device is operating or expected to operate using a single carrier configuration on a cell associated with a first frequency band, a second CA configuration is selected for the second wireless device. The first CA configuration and the second CA configuration include configurations for carrier operation on the first frequency band, and at least one parameter associated with the second CA configuration is more restrictive than at least one parameter associated with the first configuration. The at least one processor is operable to execute the instructions to transmit an identifier to the second wireless device to identify the selected one of the first CA configuration or the second CA configuration.

According to certain embodiments, a method for adapting carrier aggregation (CA) configurations by a wireless device includes obtaining information about a plurality of CA configurations for a CA operation. The plurality of configurations include at least a first CA configuration and a second CA configuration. The first CA configuration and the second CA configuration include configurations for carrier operation on a first frequency band, and at least one parameter associated with the second CA configuration is more restrictive than at least one parameter associated with the first configuration. An identifier is received from a network node. The identifier indicates a selected one of the first CA configuration and the second CA configuration to be used by the first wireless device for performing the CA operation. The second CA configuration is selected when a second wireless device is operating or expected to operate using a single carrier configuration on a cell associated with the first frequency band. A transceiver of the first wireless device is configured for performing the CA operation based on the identifier identifying the selected one of the first CA configuration and the second CA configuration.

According to certain embodiments, a wireless device for adapting carrier aggregation (CA) configurations is provided. The wireless device includes a memory storing computer-readable instructions for selecting carrier aggregation (CA) configurations and a processor that is operable, when executing the computer-readable instructions, to obtain information about a plurality of CA configurations for a CA operation. The plurality of configurations include at least a first CA configuration and a second CA configuration that are configurations for carrier operation on a first frequency band. At least one parameter associated with the second CA configuration is more restrictive than at least one parameter associated with the first configuration. An identifier is received from a network node. The identifier indicates a selected one of the first CA configuration and the second CA configuration to be used by the first wireless device for performing the CA operation. The second CA configuration is selected when a second wireless device is operating or expected to operate using a single carrier configuration on a cell associated with the first frequency band. A transceiver of the first wireless device is configured for performing the CA operation based on the identifier identifying the selected one of the first CA configuration and the second CA configuration.

Some embodiments of the disclosure may provide one or more technical advantages. For example, an advantage may be that the methods and systems ensure that a network node can successfully operate a CA-capable wireless device in any CA which involves FDD and TDD frequency bands close to each other in frequency. As another example, an advantage may be that a network node can successfully operate a CA-capable wireless device in any CA involving TDD bands with different UL/DL TDD configurations even where the TDD bands are close to each other in frequency. As still another example, an advantage may be that the methods and systems enhance user performance since CA can be effectively used even where CA uses FDD and TDD frequency bands or TDD bands (with different UL/DL TDD configurations) that are close to each other in frequency. As another example still, an advantage may be that a network node is able to perform legacy operations for wireless devices on such TDD, FDD and unlicensed bands as well as CA operations for CA-capable wireless devices. As a result, overall system performance and wireless device performance is enhanced.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Other implementations may include a wireless communication device and/or access node configured to implement the described method, or a wireless communication system in which a wireless communication device and/or access node implement the described method.

Modifications, additions, or omissions may be made to the methods disclosed herein without departing from the scope of the invention. The methods may include more, fewer, or other steps. Additionally, steps may be performed in any suitable order.

The invention claimed is:

1. A method by a network node for selecting carrier aggregation (CA) configurations, the method comprising:
   determining whether a first wireless device is operating or expected to operate using a single carrier configuration on a cell associated with a first frequency band;
   if the first wireless device is not operating or expected to operate using the single carrier configuration on the cell associated with the first frequency band, selecting a first CA configuration for a second wireless device;
   if the first wireless device is operating or expected to operate using the single carrier configuration on the cell associated with the first frequency band, selecting a second CA configuration for the second wireless device, wherein:
   the first CA configuration and the second CA configuration comprise configurations for carrier operation on the first frequency band;
   at least one parameter associated with the second CA configuration is more restrictive than at least one parameter associated with the first configuration; and
   the at least one parameter comprises
   an allowed number of resource blocks for CA operation such that the allowed number of resource blocks associated with the second CA configuration is less than the allowed number of resource blocks associated with the first CA configuration, and
   transmitting an identifier to the second wireless device, the identifier identifying the selected one of the first CA configuration or the second CA configuration.

2. The method of claim 1, wherein:
   at least one parameter associated with the second CA configuration is less restrictive than at least one parameter associated with a third configuration; and
   the third CA configuration comprising a further configuration for carrier operation of the second wireless device on the first frequency band.

3. The method of claim 1, wherein carrier operation on the first frequency band comprises maintaining simultaneous connections with the network node and at least one secondary network node.

4. The method of claim 1, wherein the first frequency band comprises an FDD frequency band and a TDD frequency band, the FDD frequency band and the TDD frequency band being adjacent to one another.

5. The method of claim 1, wherein the first frequency band comprises a first TDD frequency band and a second TDD frequency band, the first TDD frequency band and the second TDD frequency band being adjacent to one another.

6. A network node comprising:
   a memory storing computer-readable instructions for selecting carrier aggregation (CA) configurations; and
   a processor that is operable, when executing the computer-readable instructions, to:
   determine whether a first wireless device is operating or expected to operate using a single carrier configuration on a cell associated with a first frequency band;
   if the first wireless device is not operating or expected to operate using the single carrier configuration on the cell associated with the first frequency band, select a first CA configuration for a second wireless device;
   if the first wireless device is operating or expected to operate using the single carrier configuration on the cell associated with the first frequency band, select a second CA configuration for the second wireless device, wherein:
   the first CA configuration and the second CA configuration comprise configurations for carrier operation on the first frequency band;
   at least one parameter associated with the second CA configuration is more restrictive than at least one parameter associated with the first configuration; and
   the at least one parameter comprises
   an allowed number of resource blocks for CA operation such that the allowed number of resource blocks associated with the second CA configuration is less than the allowed number of resource blocks associated with the first CA configuration, and
   transmit an identifier to the second wireless device, the identifier identifying the selected one of the first CA configuration or the second CA configuration.

7. The network node of claim 6, wherein:
   at least one parameter associated with the second CA configuration is less restrictive than at least one parameter associated with a third configuration; and
   the third CA configuration comprising a further configuration for carrier operation of the second wireless device on the first frequency band.

8. The network node of claim 6, wherein carrier operation on the first frequency band comprises maintaining simultaneous connections with the network node and at least one secondary network node.

9. The network node of claim 6, wherein the first frequency band comprises an FDD frequency band and a TDD frequency band, the FDD frequency band and the TDD frequency band being adjacent to one another.

10. The network node of claim 6, wherein the first frequency band comprises a first TDD frequency band and a second TDD frequency band, the first TDD frequency band and the second TDD frequency band being adjacent to one another.

11. A method by a first wireless device for adapting carrier aggregation (CA) configurations, the method comprising:
    obtaining information about a plurality of CA configurations for a CA operation, the plurality of configurations comprising at least a first CA configuration and a second CA configuration, wherein:
    the first CA configuration and the second CA configuration comprise configurations for carrier operation on a first frequency band;
    at least one parameter associated with the second CA configuration is more restrictive than at least one parameter associated with the first configuration; and
    the at least one parameter comprises
    an allowed number of resource blocks for CA operation such that the allowed number of resource blocks associated with the second CA configuration is less than the allowed number of resource blocks associated with the first CA configuration, and receiving, from a network node, an identifier indicating a selected one of the first CA configuration and the second CA configuration to be used by the first wireless device for performing the CA operation, the second CA configuration selected when a second wireless device is operating or expected to operate using a single carrier configuration on a cell associated with the first frequency; and configuring a transceiver of the first wireless device for performing the CA operation based on the identifier identifying the selected one of the first CA configuration and the second CA configuration.

12. The method of claim 11, wherein:

at least one parameter associated with the second CA configuration is less restrictive than at least one parameter associated with a third configuration; and the third CA configuration comprising a further configuration for carrier operation of the second wireless device on the first frequency band.

13. The method of claim 11, wherein carrier operation on the first frequency band comprises maintaining simultaneous connections with the network node and at least one secondary network node.

14. The method of claim 11, wherein the first frequency band comprises an FDD frequency band and a TDD frequency band, the FDD frequency band and the TDD frequency band being adjacent to one another.

15. The method of claim 11, wherein the first frequency band comprises a first TDD frequency band and a second TDD frequency band, the first TDD frequency band and the second TDD frequency band being adjacent to one another.

16. A first wireless device comprising:

a memory storing computer-readable instructions for selecting carrier aggregation (CA) configurations; and a processor that is operable, when executing the computer-readable instructions, to:

obtain information about a plurality of CA configurations for a CA operation, the plurality of configurations comprising at least a first CA configuration and a second CA configuration, wherein:

the first CA configuration and the second CA configuration comprise configurations for carrier operation on a first frequency band;

at least one parameter associated with the second CA configuration is more restrictive than at least one parameter associated with the first configuration; and the at least one parameter comprises an allowed number of resource blocks for CA operation such that the allowed number of resource blocks associated with the second CA configuration is less than the allowed number of resource blocks associated with the first CA configuration, and receive, from a network node, an identifier indicating a selected one of the first CA configuration and the second CA configuration to be used by the first wireless device for performing the CA operation, the second CA configuration selected when a second wireless device is operating or expected to operate using a single carrier configuration on a cell associated with the first frequency band; and configure a transceiver of the first wireless device for performing the CA operation based on the identifier identifying the selected one of the first CA configuration and the second CA configuration.

17. The first wireless device of claim 16, wherein:

at least one parameter associated with the second CA configuration is less restrictive than at least one parameter associated with a third configuration; and the third CA configuration comprising a further configuration for carrier operation of the second wireless device on the first frequency band.

18. The first wireless device of claim 16, wherein carrier operation on the first frequency band comprises maintaining simultaneous connections with the network node and at least one secondary network node.

19. The first wireless device of claim 16, wherein the first frequency band comprises an FDD frequency band and a TDD frequency band, the FDD frequency band and the TDD frequency band being adjacent to one another.

20. The first wireless device of claim 16, wherein the first frequency band comprises a first TDD frequency band and a second TDD frequency band, the first TDD frequency band and the second TDD frequency band being adjacent to one another.

* * * * *